(12) United States Patent
Nishijima

(10) Patent No.: US 8,373,324 B2
(45) Date of Patent: Feb. 12, 2013

(54) FIELD ELEMENT CORE

(75) Inventor: Kiyotaka Nishijima, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 337 days.

(21) Appl. No.: 12/742,622

(22) PCT Filed: Nov. 27, 2008

(86) PCT No.: PCT/JP2008/071584
§ 371 (c)(1),
(2), (4) Date: May 12, 2010

(87) PCT Pub. No.: WO2009/069718
PCT Pub. Date: Jun. 4, 2009

(65) Prior Publication Data
US 2010/0259123 A1    Oct. 14, 2010

(30) Foreign Application Priority Data
Nov. 28, 2007    (JP) .................................. 2007-307781

(51) Int. Cl.
*H02K 1/22*    (2006.01)
*H02K 1/27*    (2006.01)
*H02K 21/14*    (2006.01)
(52) U.S. Cl. ............................. 310/156.53; 310/156.57
(58) Field of Classification Search . 310/156.53–156.57
See application file for complete search history.

(56) References Cited

FOREIGN PATENT DOCUMENTS

| JP | 7-11859 U | 2/1995 |
|---|---|---|
| JP | 9-294344 A | 11/1997 |
| JP | 10-174323 A | 6/1998 |
| JP | 11-206051 A | 7/1999 |
| JP | 2002-281700 A | 9/2002 |
| JP | 2002281700 A * | 9/2002 |
| JP | 2003-174747 A | 6/2003 |
| JP | 2004-260888 A | 9/2004 |
| JP | 2005-102460 A | 4/2005 |

OTHER PUBLICATIONS

JP 2002281700 A machine translation, Jun. 4, 2012.*

* cited by examiner

*Primary Examiner* — Quyen Leung
*Assistant Examiner* — Leda Pham
(74) *Attorney, Agent, or Firm* — Birch, Stewart, Kolasch & Birch, LLP.

(57) ABSTRACT

A field element core includes field magnet through holes and coupling part. The field magnet through holes are circularly disposed in a peripheral direction around a predetermined direction and are adjacent to each other in the peripheral direction to form a set. The field magnet through holes forming the same pair both extend along a given direction that is defined for each pair, when viewed from the predetermined direction. The coupling part 11 is provided between the field magnet through holes forming the same set and has ends as lateral surfaces, respectively. The entire lateral surfaces of the coupling part are curved to form a concave shape. Specifically, viewed from the predetermined direction, only at a given position between both ends of the lateral surface, a tangent of the lateral surface extends along an extending direction of the coupling part. The same holds true for the lateral surface.

15 Claims, 26 Drawing Sheets

F I G. 6
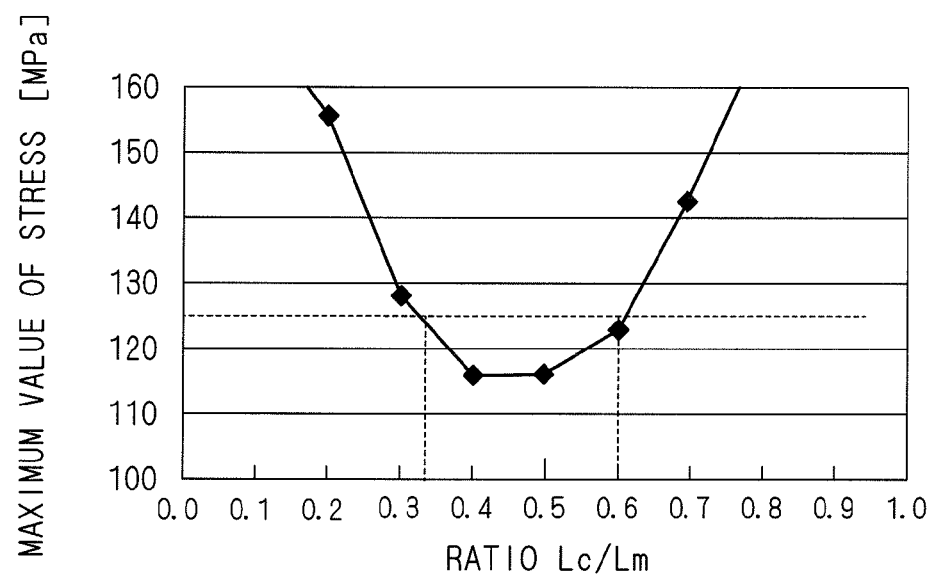
F I G. 7
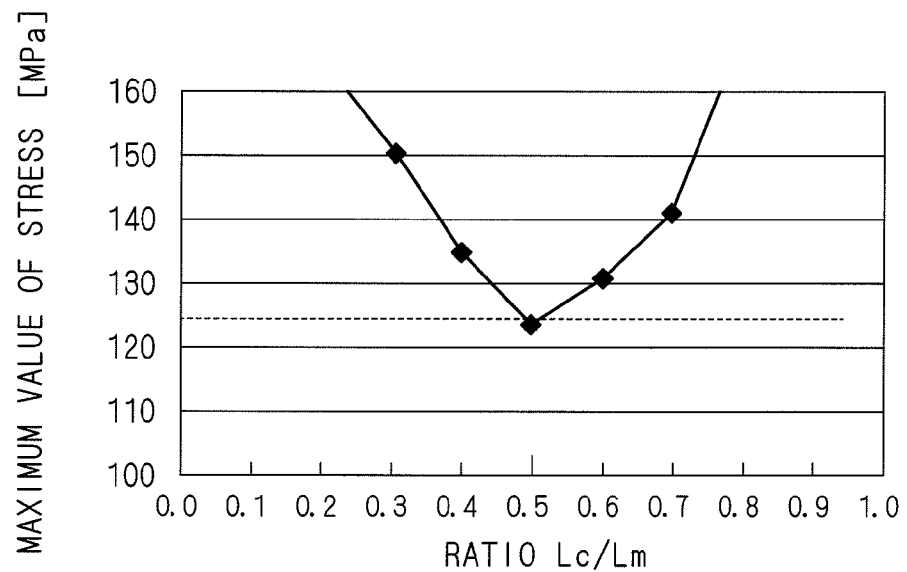

F I G . 1 1
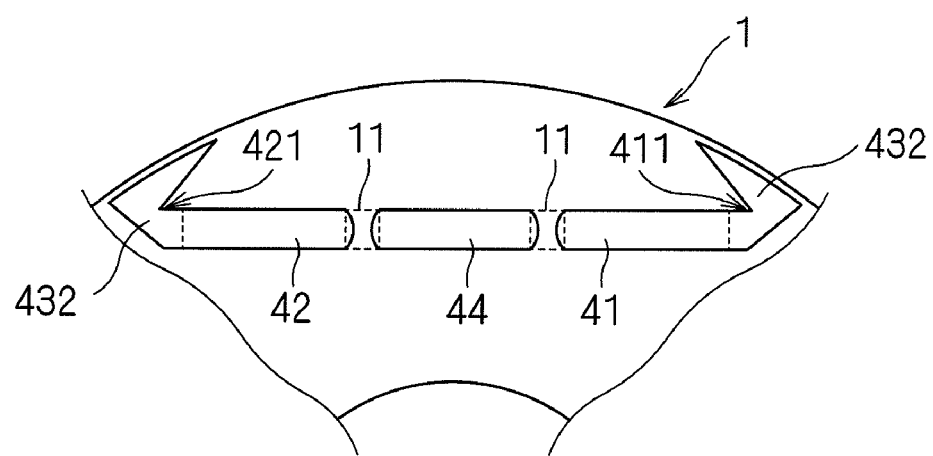

F I G. 1 2
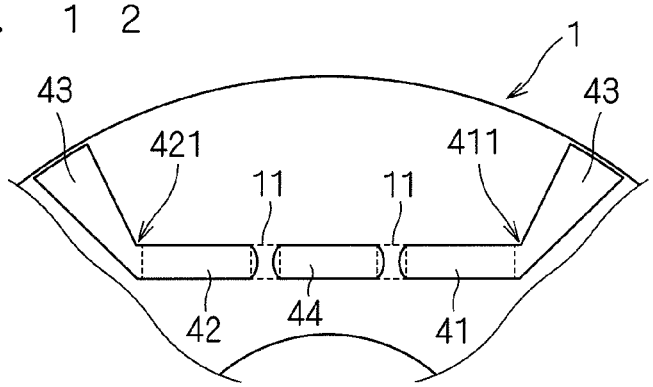
F I G. 1 3
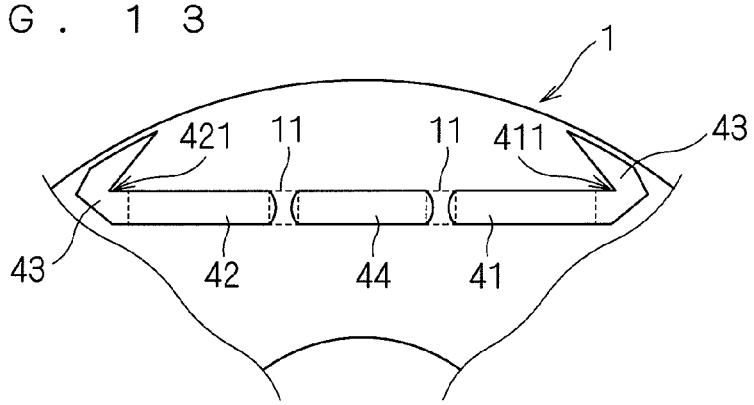
F I G. 1 4
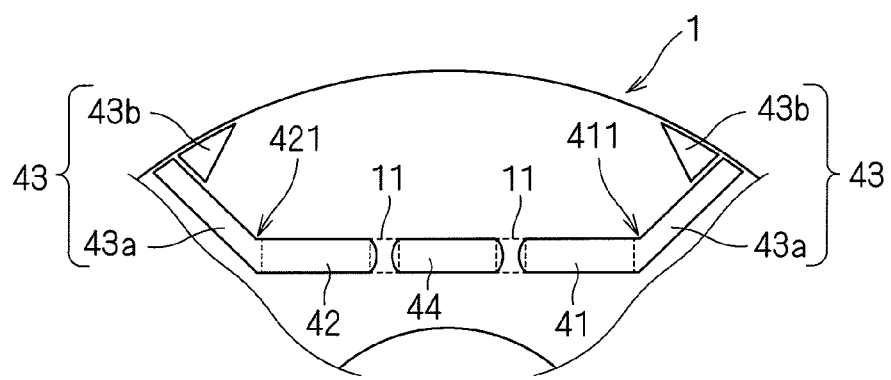

F I G . 1 8
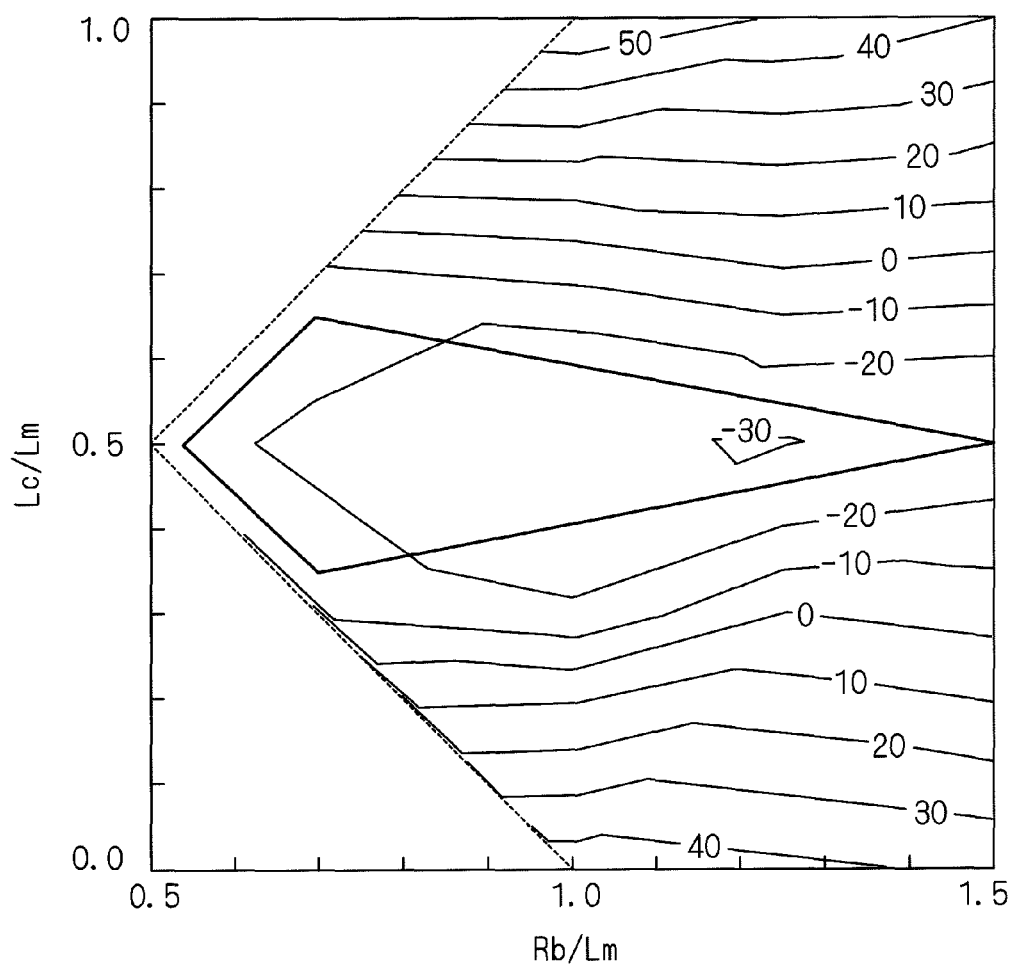

F I G . 2 0
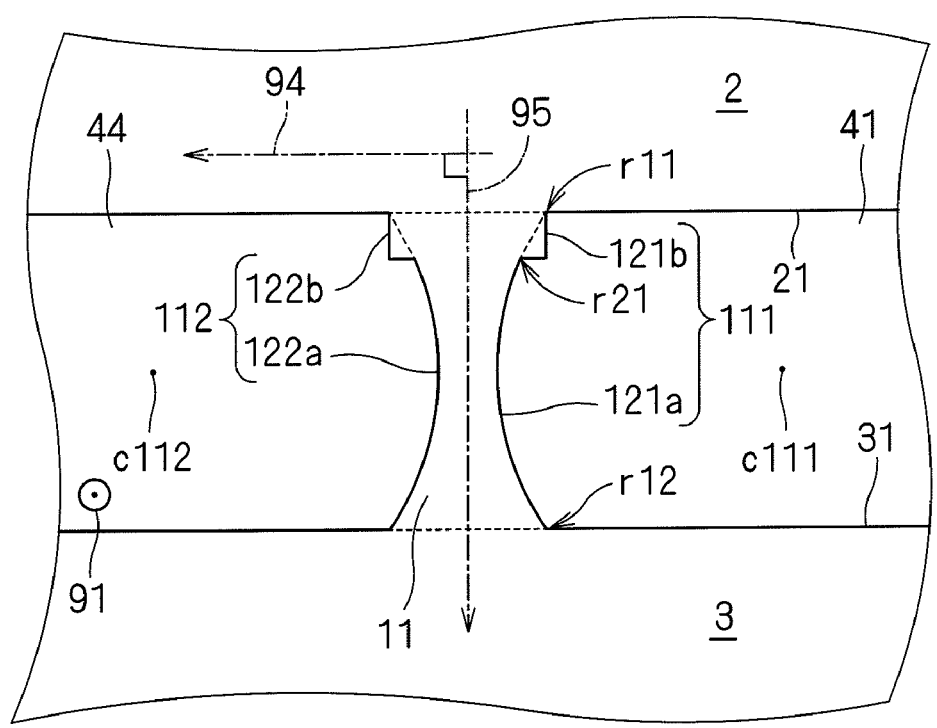

F I G. 2 5
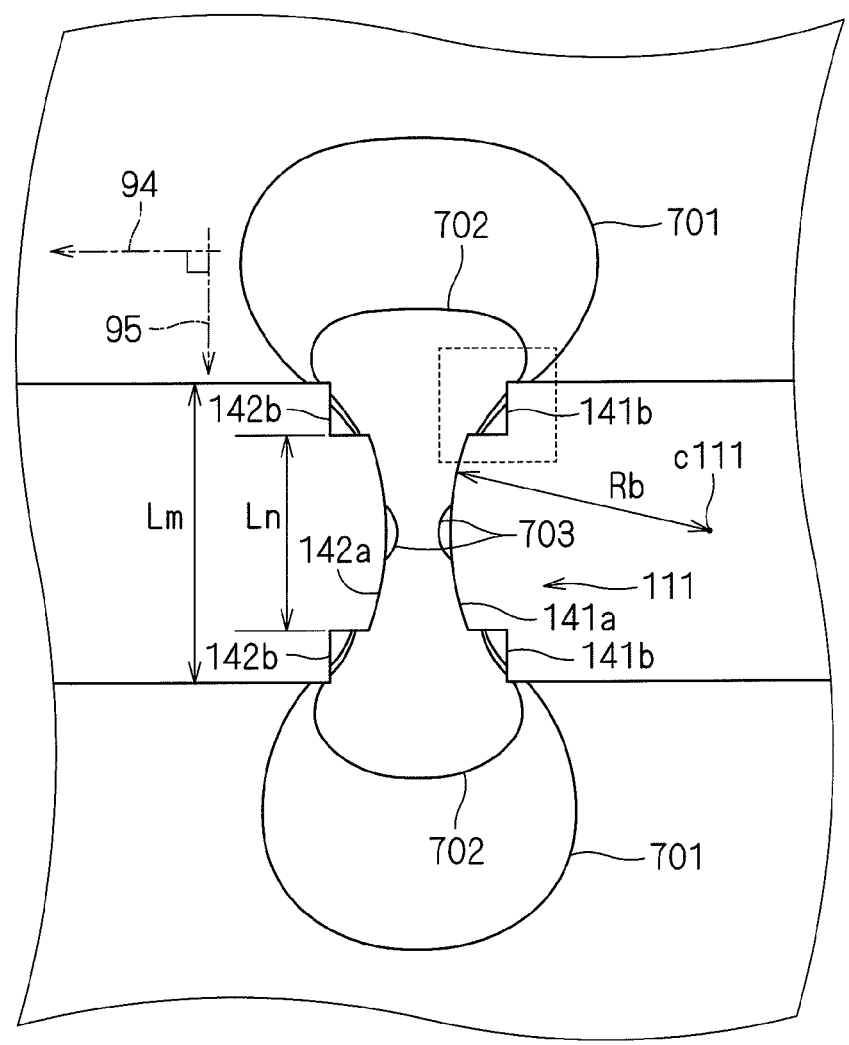

F I G. 3 5
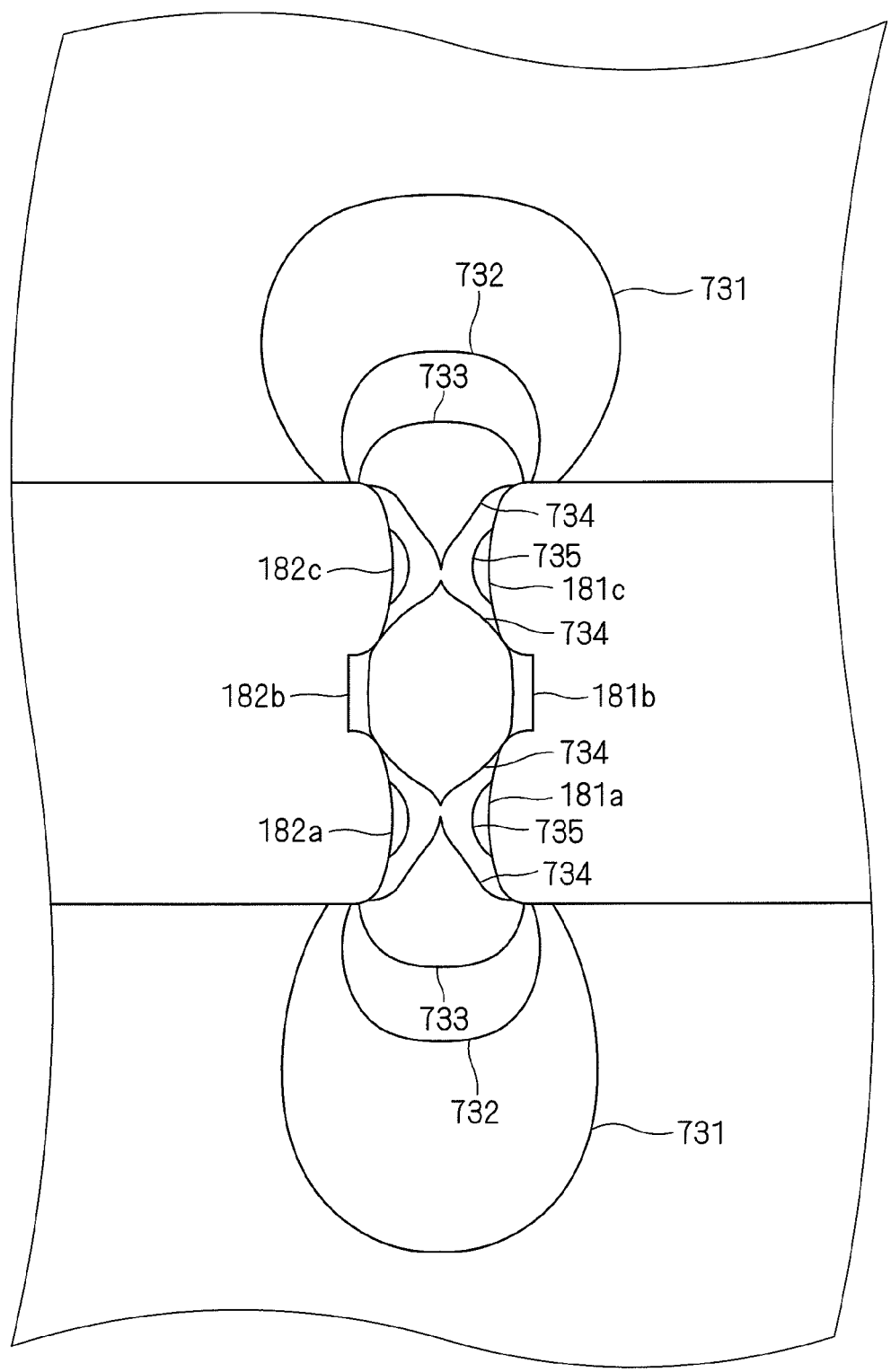

FIELD ELEMENT CORE

FIELD ELEMENT CORE

1. Technical Field

The present invention relates to a field element core, and more particularly, to a shape of a field element core.

2. Background Art

Conventionally, the technology of increasing the strength of a field element core has been proposed. For example, Japanese Utility Model Application Laid-Open No. 07-11859 discloses the technology of dividing a slot into which a field magnet is inserted into two to provide the divided slots with a coupling part (referred to as "bridge" in Japanese Utility Model Application Laid-Open No. 07-11859) that couples an outer peripheral side and an inner peripheral side of a field element core.

However, the divided slots of Japanese Utility Model Application Laid-Open No. 07-11859 have a rectangular shape, and thus corners are formed in the root of the coupling part. Therefore, the stress generated in the coupling part is concentrated on the corners, leading to a fear that the coupling part and, eventually, the field element core may be deformed.

For example, Japanese Patent Application Laid-Open Nos. 2002-281700 and 2004-260888 describe the technology of rounding corners of a coupling part, to thereby mitigate concentration of stress.

In addition, Japanese Patent Application Laid-Open Nos. 09-294344 and 2003-174747 describe the technology related to the present invention.

DISCLOSURE OF INVENTION

Problem to be Solved by the Invention

However, in Japanese Patent Application Laid-Open Nos. 2002-281700 and 2004-260888, only the corners are rounded, whereas other parts are flat. Accordingly, the stress is still easily concentrated in the vicinity of the rounded corners.

The present invention has been made in view of the above-mentioned circumstances, and an object thereof is to mitigate concentration of stress in a coupling part.

Means to Solve the Problem

According to a first aspect of a field element core of the present invention includes: field magnet through holes (41, 42, 44) circularly disposed in a peripheral direction (92) around a predetermined axis (P) and being adjacent to each other in the peripheral direction to form sets, each of the field magnet through holes having a pair of ends (411, 412, 421, 422, 441, 442) in the peripheral direction; and a coupling part (11; 17; 18) provided between two of the field magnet through holes forming one of the sets, the coupling part having, as lateral surfaces (111, 112; 111, 121; 171, 172; 181, 182) being the ends (412, 442; 422, 441) that belong to the two of the field magnet through holes respectively and are adjacent to each other in the peripheral direction, wherein: at least one (111; 111; 171; 181) of the lateral surfaces includes at least one of curved portions (111a; 121a to 161a; 171a; 181a, 181c) extending along a circle with a center (c111; c111; c171; c1811, c1812) positioned on a side opposite to the coupling part with respect to the at least one of the lateral surfaces, viewed from a first direction (91) along the axis; and a first ratio x and a second ratio y (Lc/Lm) satisfy $y \leq x - 0.05$, $y \geq -x + 1.05$, $y \leq -3/16 \cdot x + 25/32$, and $y \geq 3/16 \cdot x + 7/32$, wherein the curved portion, x represents a ratio of a radius (Rb) of the circle with respect to a length (Lm; Ln; ..., Ln1, Ln2) in a third direction perpendicular to a second direction (941, 942, 944) in which one of the field magnet through holes including the at least one of the lateral surfaces extends from the coupling part, and y represents a ratio of a distance (Lc) between a surface (31) of the field magnet through hole positioned on the axis side in a radial direction with the axis being a center and the center with respect to the length (Lm) of the coupling part in the third direction.

According to a second aspect of the field element core of the present invention, in the field element core according to the first aspect, the field magnet through holes (41, 42, 44) forming one of the sets each extend along a given direction (94) determined for each of the sets, viewed from the first direction (91).

According to a third aspect of the field element core of the present invention, in the field element core according to the first or second aspect, the second ratio (Lc/Lm) is 0.5.

According to a fourth aspect of the field element core of the present invention, in the field element core according to the first or second aspect, the second ratio (Lc/Lm) is a value other than 0.5.

According to a fifth aspect of the field element core of the present invention, in the field element core according to any one of the first to fourth aspects, the lateral surfaces (111, 112; 111, 121; 171, 172; 181, 182) of the coupling part each include the at least one of curved portions (111a; 121a to 161a; 171a; 181a, 181c); and a normal of a line joining the center (c111; c171; c181) of the at least one of curved portions included in one of the lateral surfaces to the center (c112, c172, c182) of the at least one of curved portions include in another of the lateral surfaces is parallel to a bisector of an angle formed on the axis (P) side by the second directions (941, 942) of the two of the field magnet through holes to which the lateral surfaces respectively belong.

According to a sixth aspect of the field element core of the present invention, in the field element core according to any one of the first to fifth aspects, both ends (r11, r12; r31, r32) of the at least one of curved portions (111a; 171a) are connected to surfaces (21, 31, 41) of one of the field magnet through holes (41, 42, 44), the surfaces respectively being positioned on an outer peripheral side and an inner peripheral side with respect to the coupling part (11, 17); and a boundary between the at least one of curved portions and the coupling part is rounded or forms a corner.

According to a seventh aspect of the field element core of the present invention, in the field element core according to any one of the first to fifth aspects, the at least one of the lateral surfaces (111; ...; 111; 111; 181) viewed from the first direction (91) further includes a plane portion (121b; ...; 151b; 161b; 181b) which extends along the third direction (951, 952, 954); and one end (r21; r23; r41; r51; r62; r71) of both ends of the at least one of curved portions (121a; ...; 161a; 181a) is connected to the surface (21; ...; 21; 31; 21) positioned on the same side as the one end with respect to the at least one of curved portions, via the plane portion.

According to an eighth aspect of the field element core of the present invention, in the field element core according to the seventh aspect, the one end (r51; r62) of the at least one of curved portions (151a; 161a) is directly connected to the flat portion (151b; 161b).

According to a ninth aspect of the field element core according to the present invention, in the field element core according to the seventh aspect, the plane portion (121b; ... 141b; 181b) viewed from the first direction (91) projects beyond the at least one of curved portions (121*a*; . . . ; 141*a*; 181*a*) along the second direction (941, 942, 954).

According to a tenth aspect of the field element core of the present invention, in the field element core according to any one of the seventh to ninth aspects, the at least one of curved portion if a pair of curved portions, the at least one of lateral surfaces (181) includes, viewed from the first direction (91), the pair of curved portions (181*a*, 181*c*); and the plane portion (181*b*) is provided between the pair of curved portions.

According to an eleventh aspect of the field element core of the present invention, in the field element core according to any one of the first to tenth aspects, the field magnet through holes (41, 42) are curved or bent from the coupling part (11) to extend, and the second direction (9411) is a linear direction extending with the coupling part being a starting point.

Effects of the Invention

According to the first to third and eleventh aspects of the field element core of the present invention, the stress generated in the coupling part is easily dispersed by providing the curved portion. Therefore, stress concentration can be mitigated in the coupling part.

According to the fourth aspect of the field element core of the present invention, the center of the curved portion is shifted from the center between both ends of the curved portion in the third direction. In this case, it is possible to increase an angle formed by the second direction and the tangent at the end of the curved portion on the side opposite to the direction in which the center is shifted. Therefore, stress concentration can be mitigated at the end.

According to the fifth aspect of the field element core of the present invention, the length of the field magnet through hole in the second direction can be increased, whereby it is possible to insert a longer magnet in the second direction.

According to the sixth aspect of the field element core of the present invention, the entire lateral surface is curved, whereby the stress concentration is difficult to occur in the coupling part.

According to the seventh aspect of the field element core of the present invention, the stress generated in the coupling part can be dispersed in the curved portion. Moreover, the curved portion is provided to the lateral surface, whereby it is possible to provide the plane portion without narrowing an area of the field magnet through hole that is viewed from the predetermined direction. In a case where a magnet is inserted into the field magnet through hole, the magnet can be fixed in the plane portion.

According to the eighth aspect of the field element core of the present invention, the stress generated in the coupling part can be dispersed in the curved portion. In addition, when the curved portion is provided to the lateral surface, the plane portion can be provided without narrowing an area of the field magnet through hole that is viewed from the predetermined direction. Further, in a case where a magnet is inserted into the field magnet through hole, the magnet can be fixed in the plane portion.

According to the ninth aspect of the field element core of the present invention, the stress generated in the coupling part can be dispersed in the curved portion. Moreover, when the curved portion is provided to the lateral surface, the plane portion can be provided without narrowing an area of the field magnet through hole that is viewed from the predetermined direction. In a case where a magnet is inserted into the field magnet through hole, the magnet can be fixed in the plane portion.

According to the tenth aspect of the field element core of the present invention, the stress generated in the coupling part can be dispersed in the first and second curved portions. In addition, in a case where a magnet is inserted into the field magnet through hole, the magnet can be fixed in the plane portion. Further, even in a case where the end surface of the magnet on the coupling part side is curved in a convex shape, it is possible to provide the plane portion correspondingly to the end surface.

The object, features, aspects, and advantages of the present invention will be more apparent from the following detailed description in conjunction with the attached drawings.

BRIEF DESCRIPTION OF DRAWINGS

FIGS. 6 and 7 are figures showing the relationship between a ratio Lc/Lm and the maximum value of the stress generated in the coupling part 11;

FIG. 11 is a view showing cavities 432 provided in the field magnet through holes 41 and 42;

FIGS. 12 to 14 are views showing cavities 43 provided in the field magnet through holes 41 and 42;

FIG. 18 is a figure showing the relationship between the ratio Rb/Lm, the ratio Lc/Lm and an evaluation value E3;

FIGS. 20 to 24 are views conceptually showing a coupling part 11 described in a second embodiment;

FIG. 25 is a view showing a stress generated in the coupling part 11 shown in FIG. 22 by contour lines;

FIG. 35 is a view showing a stress generated in the coupling part 18 by contour lines;

BEST MODES FOR CARRYING OUT THE INVENTION

Figure 1:
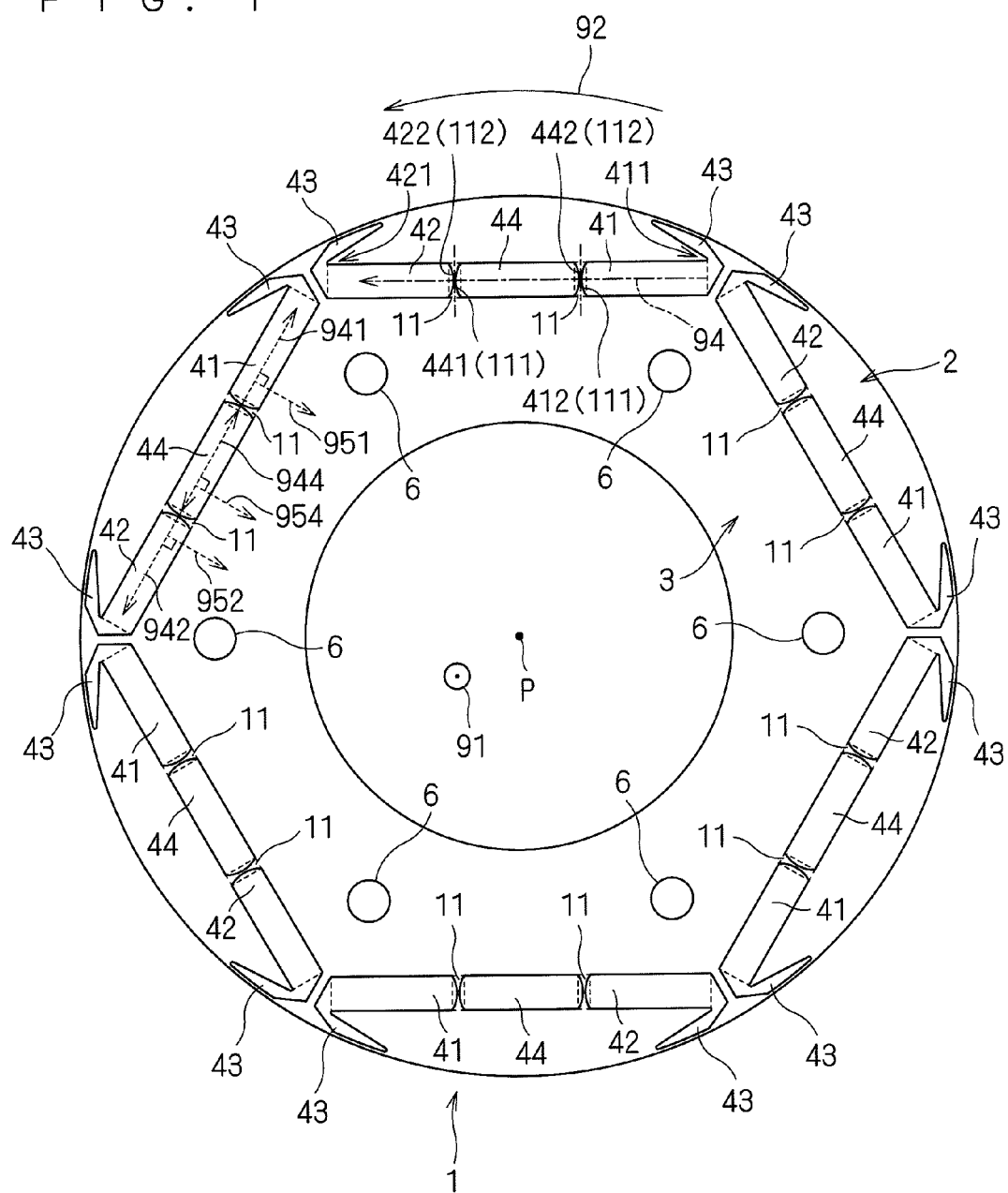
FIG. 1 is a top view conceptually showing a field element core 1 according to the present invention.

FIG. 1 is a top view conceptually showing a field element core 1 according to the present invention. The field element core 1 includes field magnet through holes 41, 42 and 44 and coupling parts 11 (coupling parts 17 and 18 in third and fourth embodiments described below, respectively).

The field magnet through holes 41, 42 and 44 are circularly disposed in a peripheral direction 92 around a direction 91 along a predetermined axis P, and are adjacent to each other in the peripheral direction 92 to form sets. FIG. 1 shows a case where the field magnet through holes 41, 42 and 44 forming the same set extend along a given direction 94 that is determined for each set, viewed from the predetermined direction 91. Note that when viewed from the predetermined direction 91, any one of the field magnet through holes 41, 42 and 44 forming the same set may be tilted with respect to another one thereof. Specifically, a direction 941 in which the field magnet through hole 41 extends, a direction 942 in which the field magnet through hole 42 extends and a direction 944 in which the field magnet through hole 44 extends may intersect each other. Note that in embodiments described below, description will be mainly given of a case where the field magnet through holes 41, 42 and 44 each extend along the given direction 94.

The field magnet through hole 41 has a pair of ends 411 and 412 in the peripheral direction 92, the field magnet through hole 42 has a pair of ends 421 and 422 in the peripheral direction 92, and the field magnet through hole 44 has a pair of ends 441 and 442 in the peripheral direction 92.

The coupling parts 11 are provided between ones of the field magnet through holes 41, 42 and 44 that form the same set. The coupling part 11 positioned between the field magnet through holes 41 and 44 has the ends 412 and 442 as lateral surfaces 111 and 112, respectively, and the coupling part 11 positioned between the field magnet through holes 42 and 44 has the ends 441 and 422 as lateral surfaces 111 and 112, respectively. The above is considered as follows; the ends that belong to different field magnet through holes and are adjacent to each other in the peripheral direction 92 respectively constitute the lateral surfaces 111 and 112 of the coupling part 11. Note that the coupling part 11 may be provided between the field magnet through holes 41 and 44 or between the field magnet through holes 42 and 44 that form the same set.

Shapes of the lateral surfaces 111 and 112 of the coupling part 11 will be described below. Note that in FIG. 1, a core part on a side (hereinafter, referred to as outer peripheral side) opposite to the axis P and a core part on the axis P side (hereinafter, referred to as inner peripheral side) are denoted by reference numerals 2 and 3, respectively, with respect to the field magnet through holes 41, 42 and 44 and the coupling parts 11 in the field element core 1.

First Embodiment

Figure 2:
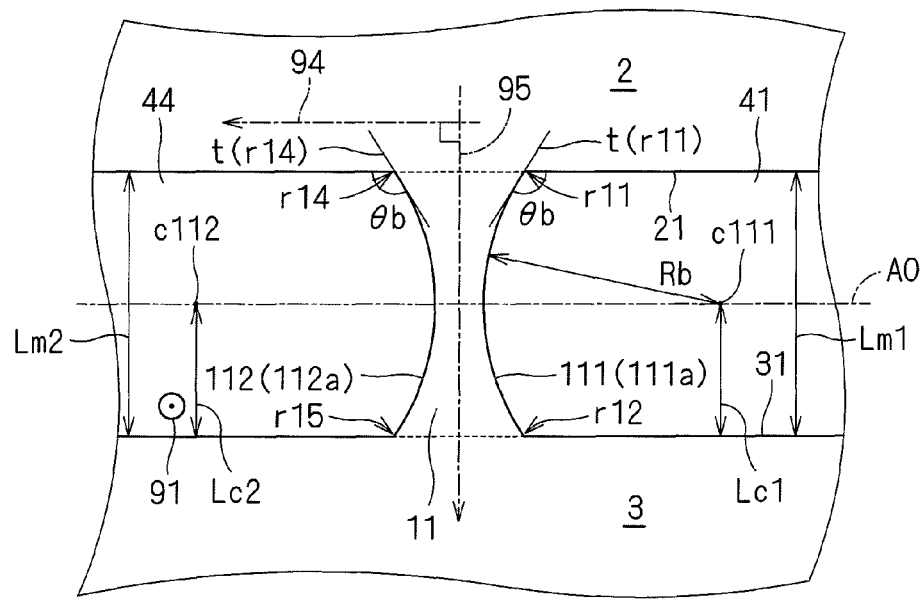
FIGS. 2 and 3 are views conceptually showing a coupling part 11 described in a first embodiment.
Figure 3:
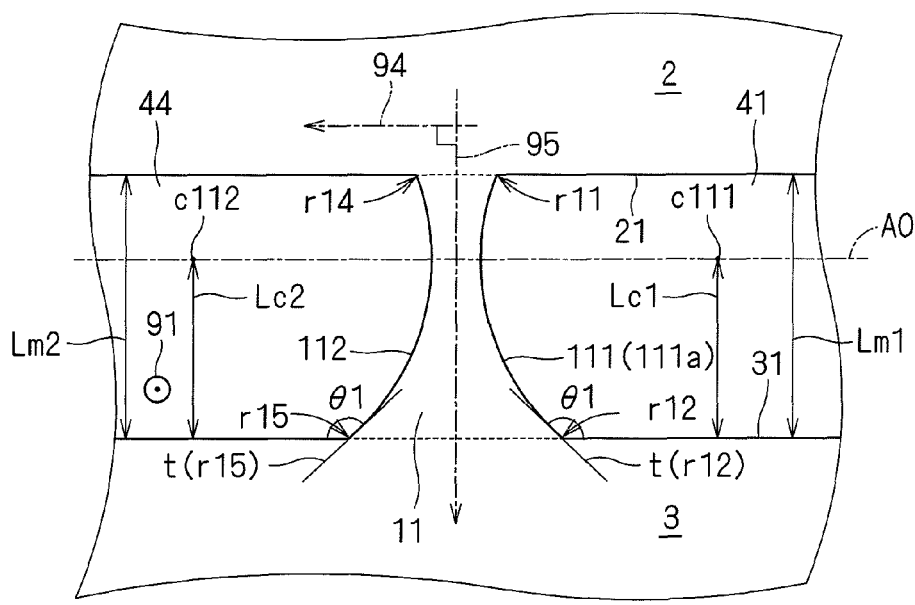

FIG. 2 and FIG. 3 show enlarged one of the coupling parts 11 shown in FIG. 1. The entire lateral surfaces 111 and 112 of the coupling part 11 are curved to form a concave shape along a circle. Note that the following description is given of the coupling part 11 positioned between the field magnet through holes 41 and 44, which holds true for the coupling part 11 positioned between the field magnet through holes 42 and 44.

According to the shapes of the lateral surfaces 111 and 112 described above, the entire lateral surfaces 111 and 112 are curved, and thus the stress generated in the coupling part 11 is dispersed. As a result, the stress is not concentrated in the coupling part 11.

Note that when the entire lateral surfaces 111 and 112 are regarded to be curved portions 111a and 112a, the above-mentioned shapes of the lateral surfaces 111 and 112 are regarded as follows. That is, both ends of the curved portion 111a are, when viewed from the predetermined direction 91, respectively connected to a surface 21 on the core part 2 side of the field magnet through hole 41 and a surface 31 on the core part 3 side thereof. The curved portion 112a is understood in a similar manner. Note that it is only required that at least any one of the lateral surfaces 111 and 112 include a curved portion. This holds true for other embodiments.

From the viewpoint of dispersion of the stress, a straight line A0 joining a center c111 of a circle along which the curved portion 111a extends and a center c112 of a circle along which the curved portion 112a extends desirably extends along the given direction 94.

In particular, FIG. 2 shows a case where the centers c111 and c112 are positioned at the centers of widths of the field magnet through holes 41 and 44 in a direction 95 perpendicular to the given direction 94. That is, a ratio Lc1/Lm1 is 0.5, where Lm1 represents a width of the field magnet through hole 41 in the direction 95 and Lc1 represents a distance between the center c111 and the surface 31. Similarly, a ratio Lc2/Lm2 is 0.5 as well, where Lm2 represents a width of the field magnet through hole 44 in the direction 95 and Lc2 represents a distance between the center c112 and the surface 31. Note that description is given here by taking, as an example, a case where the widths Lm1 and Lm2 are equal to each other as the width Lm and the distances Lc1 and Lc2 are equal to each other as the distance Lc.

In addition, FIG. 3 shows a case where the centers c111 and c112 are shifted toward the core part 2 side from the centers of the field magnet through holes 41 and 44 in the direction 95, respectively. That is, the ratio Lc1/Lm1 is a value larger than 0.5. Similarly, the ratio Lc2/Lm2 is a value larger than 0.5 as well.

According to the above-mentioned shape, on a side opposite to the direction in which the centers c111 and c112 are shifted from the centers of the widths of the field magnet through holes 41 and 44, respectively, that is, at an end r12 of the lateral surface 111 on the core part 3 side in FIG. 3, an angle θ1 formed by a tangent t (r12) of the lateral surface 111 and the surface 31 of the field magnet through hole 41 on the field magnet through hole 41 side is large. Accordingly, concentration of stress is mitigated at the end r12. Similarly, also at an end r15 of the lateral surface 112, the angle θ1 formed by a tangent t (r15) of the lateral surface 112 and the surface 31 of the field magnet through hole 44 on the field magnet through hole 44 side is large, and accordingly concentration of stress is mitigated at the end r15.

For example, the centers c111 and c112 both may be shifted toward the core part 3 side with respect to the centers of the widths of the field magnet through holes 41 and 44, respectively.

Figure 4:
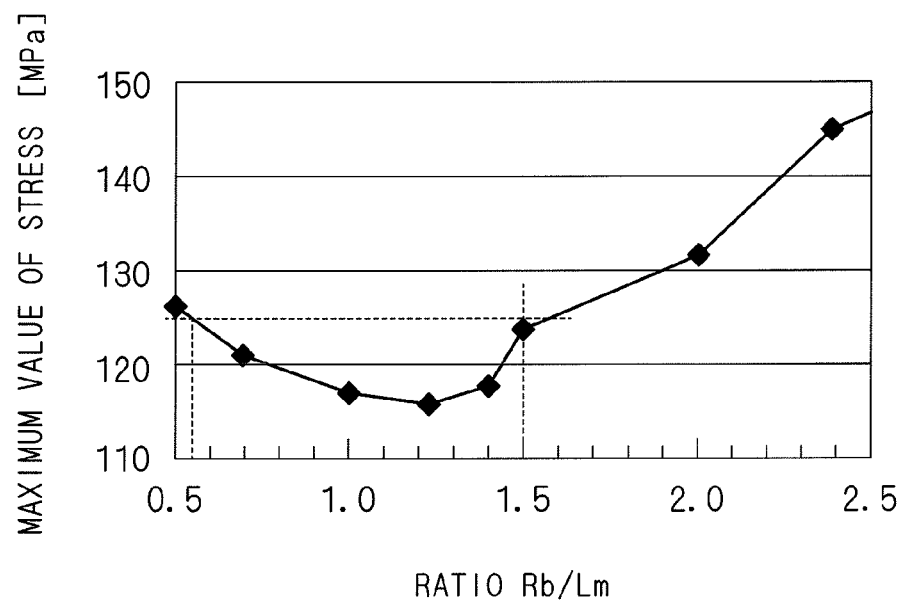
FIG. 4 is a figure showing the relationship between a ratio Rb/Lm and a maximum value of a stress generated in the coupling part 11.

FIG. 4 shows in graph the relationship between a ratio Rb/Lm of a radius Rb of a circle along which the lateral surface 111 extends to the width Lm and a maximum value of the stress generated in the coupling part 11, in the shape of the coupling part 11 shown in FIG. 2.

An angle θb formed by a tangent t (r11) and the surface 21 on the field magnet through hole 41 side is expressed by Expression (1) using the ratio Rb/Lm of the radius Rb of the circle along which the lateral surface 111 extends to the width Lm. Note that the given direction 94 is assumed to be a direction in which the field magnet through holes 41 and 42 each extend from the coupling part 11, which is the same in the following.

$$\theta b = 90° + \sin^{-1}(\tfrac{1}{2} \cdot (Lm/(2 \cdot Rb))) \quad (1)$$

Figure 5:
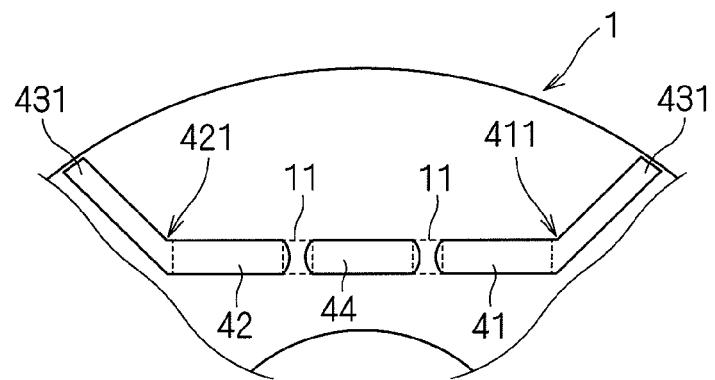
FIG. 5 is a view showing cavities 431 provided in field magnet through holes 41 and 42.

The graph of FIG. 4 shows the results obtained by performing simulation under the following conditions. That is, an outer diameter of the field element core 1 is 88.6 (mm), the number of revolutions is 120 (/sec), a minimum width Lb of the coupling part 11 in the given direction 94 is 0.6 (mm), the width Lm is 2.8 (mm), and the radius Rb is from 1.4 to 7.0 (mm), that is, the ratio Rb/Lm is from 0.5 to 2.5. Moreover, as shown in FIG. 5, the ends 411 and 421 of the field magnet through holes 41 and 42, respectively, are provided with cavities 431. The cavities 431 extend from the ends 411 and 421 to the outer peripheral side of the field element core 1. Note that in the simulation, a roundness of a radius of 0.2 (mm) was provided at boundaries between the lateral surfaces 111 and 112 and the surfaces of the field magnet through holes. Note that the boundaries are not necessarily required to be rounded but may be squared. The same holds true for other simulation results described below.

The graph of FIG. 4 reveals that a maximum value of the stress is equal to or less than 125 MPa when the ratio Rb/Lm is within the range of 0.55 to 1.5. Note that the angle θb corresponds to the range of 155.4 to 135.6(°) on this occasion (see Expression 1).

The graph of FIG. 6 shows the results obtained by simulating the maximum value of the stress by changing the distance Lc when the ratio Rb/Lm is 1.0. The other conditions are the same as those of FIG. 4. The graph of FIG. 6 reveals that the maximum value of the stress is equal to or less than 125 MPa when the ratio Lc/Lm is within the range of approximately 0.33 to 0.6.

The graph of FIG. 7 shows the results obtained by simulating the maximum value of the stress by changing the distance Lc when the ratio Rb/Lm is 1.5. The other conditions are the same as those of FIG. 4. The graph of FIG. 7 reveals that the maximum value of the stress is equal to or less than 125 MPa when the ratio Lc/Lm is 0.5.

Figure 8:
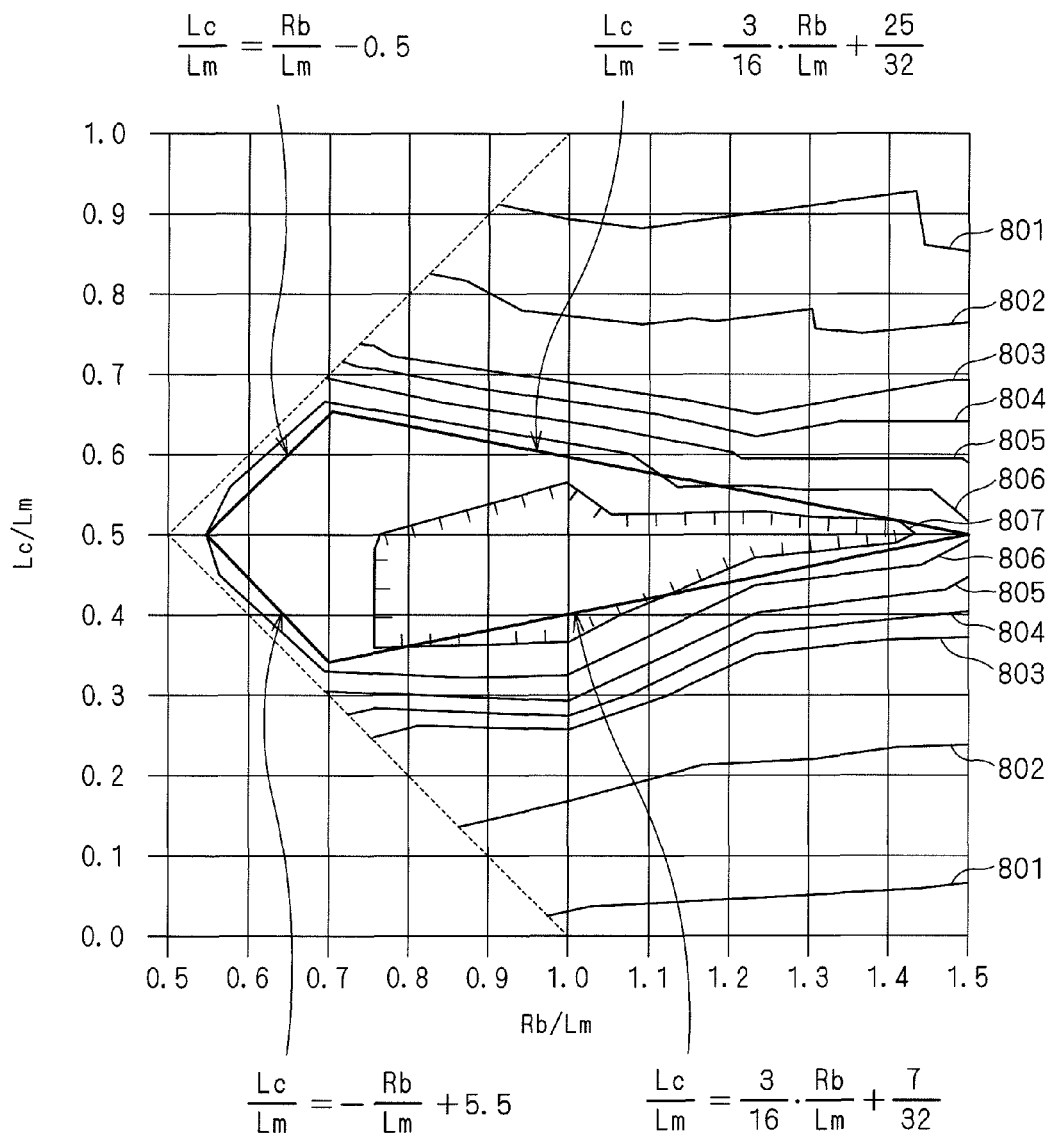
FIG. 8 is a figure showing the relationship among the ratio Rb/Lm, the ratio Lc/Lm and the maximum value of the stress generated in the coupling part 11.

The graphs of FIGS. 4, 6 and 7 reveal that the ratio Rb/Lm and the ratio Lc/Lm affect the maximum value of the stress and have optimum ranges for reducing the maximum value of the stress. FIG. 8 shows the maximum value of the stress by contour lines 801 to 807, where a horizontal line represents the ratio Rb/Lm and a vertical line represents the ratio Lc/Lm. A line indicated by a broken line is a limit line for maintaining a shape as a field magnet through hole, and a contour line is not shown in a portion outside this range. The contour lines 801 to 807 become smaller in this order. More specifically, the contour line 801 indicates 180 MPa, the contour line 802 indicates 160 MPa, the contour line 803 indicates 140 MPa, the contour line 804 indicates 135 MPa, the contour line 805 indicates 130 MPa, the contour line 806 indicates 125 MPa, and the contour line 807 indicates 120 MPa. Short lines are provided inside the contour line 807, which means that the maximum value of the stress is less than 120 MPa in this region.

The contour lines shown in FIG. 8 reveal that the maximum value of the stress is made to approximately equal to or less than 125 MPa in the region circled by a heavy line. This region is represented by the following expressions.

$$Lc/Lm \leq Rb/Lm - 0.05 \quad (2),$$

$$Lc/Lm \geq -Rb/Lm + 1.05 \quad (3),$$

$$Lc/Lm \leq -3/16 \cdot (Rb/Lm) + 25/32 \quad (4), \text{ and}$$

$$Lc/Lm \geq 3/16 \cdot (Rb/Lm) + 7/32 \quad (5)$$

Note that, conventionally, at the boundaries between the curved portion 111a and the surfaces 21 and 31 of the field magnet through hole, a tangent of the curved portion 111a is made to be parallel to the surfaces 21 and 31 to eliminate corners, to thereby reduce stress concentration. That is, compared with a conventional case where the ratio Rb/Lm is 0.5, the stress can be reduced further in the region satisfying Expressions (2) to (5) as shown in FIG. 8. As described above, in the present embodiment, stress concentration can be reduced even in a shape in which the angle θb (see FIG. 2) is smaller than 180°, that is, in a shape in which a concentration reducing effect is not typically expected.

Figure 9:
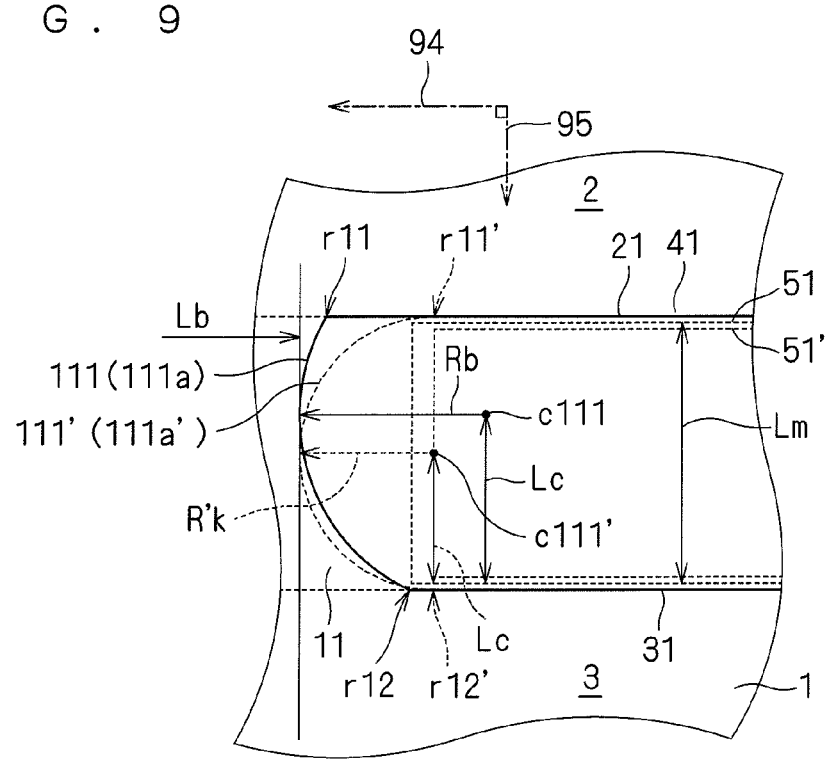
FIG. 9 is a view for describing a length of a magnet inserted into the field magnet through hole.

In addition, in the region satisfying Expressions (2) to (5), it is possible to insert magnets having a longer length in the direction 94 into the field magnet through holes 41, 42 and 44. More specific description is given with reference to FIGS. 9 and 10. FIG. 9 shows the field magnet through hole 41 in a case where the ratio Lc/Lm is the maximum value, 0.65, and the ratio Rb/Lm is 0.7 (see FIG. 8) in the region shown in FIG. 8. For comparison, in FIG. 9, a curved portion 111a' in a case where the ratio Lc/Lm and the ratio Rb/Lm are both 0.5 is indicated by a broken line.

As shown in FIG. 9, both ends r11 and r12 of the curved portion 111a are positioned on a side closer to the coupling part 11 compared with both ends r11' and r12' of the curved portion 111a'. Therefore, it is possible to insert a magnet having a longer length in the direction 94 into the field magnet through hole 41. That is, as a magnet 51 to be inserted into the field magnet through hole 41 having the curved portion 111a, it is possible to use one having a longer length in a direction 94 compared with a magnet 51' to be inserted into a field magnet through hole having a curved portion 111a'.

In view of the length of the magnet in the direction 94, the ratio Lc/Lm is desirably 0.5 from the symmetry of the curved portions 111a and 112a in the direction 95, and further, the ratio Rb/Lm is desirably large. Accordingly, in view of the length of the magnet, the ratio Lc/Lm and the ratio Rb/Lm are desirably 0.5 and 1.5, respectively, also in consideration of the region of FIG. 8.

Figure 10:
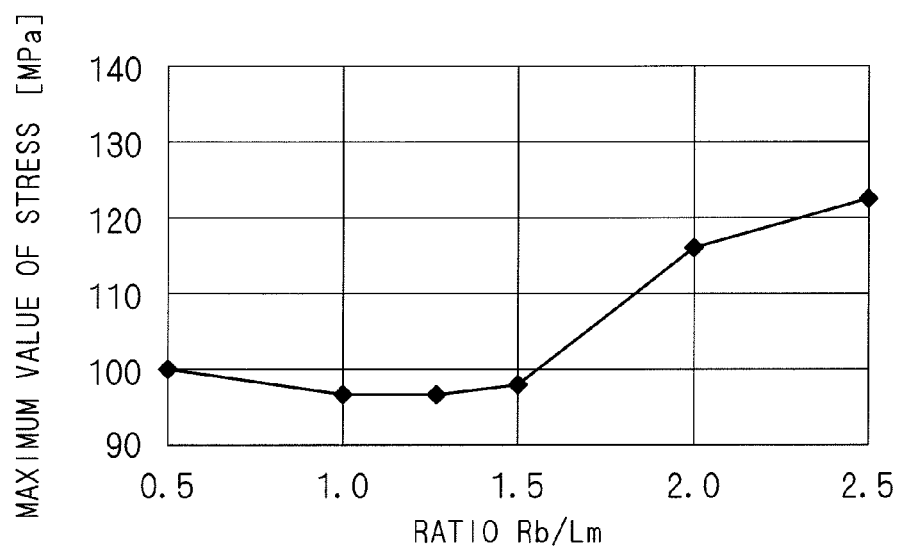
FIG. 10 is a figure showing the relationship between an angle θb and the maximum value of the stress generated in the coupling part 11.

FIG. 10 shows simulation results obtained by changing conditions from those of the graph of FIG. 4. The conditions are as follows; the outer diameter of the field element core 1 is 123 (mm), the number of revolutions is 120 (/sec), the minimum width Lb is 0.7 (mm), the width Lm is 5.2 (mm), and the radius Rb is from 2.6 to 10.4 (mm) In addition, as shown in FIG. 11, cavities 432 are provided at the ends 411 and 421 of the field magnet through holes 41 and 42, respectively. The cavities 432 extend from the ends 411 and 421 to the space between the field element core 1 and the outer periphery of the field element core 1. Note that in this simulation, a roundness of a radius of 0.2 (mm) was provided at boundaries between the surfaces of the field magnet through hole and each of the lateral surfaces 111 and 112.

The graph of FIG. 10 reveals that a maximum value of the stress is equal to or less than 100 (MPa) when the ratio Rb/Lm is within a range of 0.55 to 1.5.

The ends 411 and 412 may be provided with cavities 43 having shapes shown in, for example, FIGS. 12 to 14. In FIG. 12, the cavities 43 extend from the ends 411 and 421 to the outer periphery of the field element core 1 and enlarge toward the outer periphery side. In FIG. 13, the cavities 43 extend from the ends 411 and 421 to the space between the outer periphery and each of the field magnet through holes 41 and 42, and the space between the void 43 and the outer periphery becomes narrower as closer to the tip of the cavity 43. In FIG. 14, the cavities 43 include portions 43a extending from the ends 411 and 421 to the outer periphery and portions 43b provided between the field magnet through holes 41 and 42 and the outer periphery to be apart from those portions.

Figure 15:
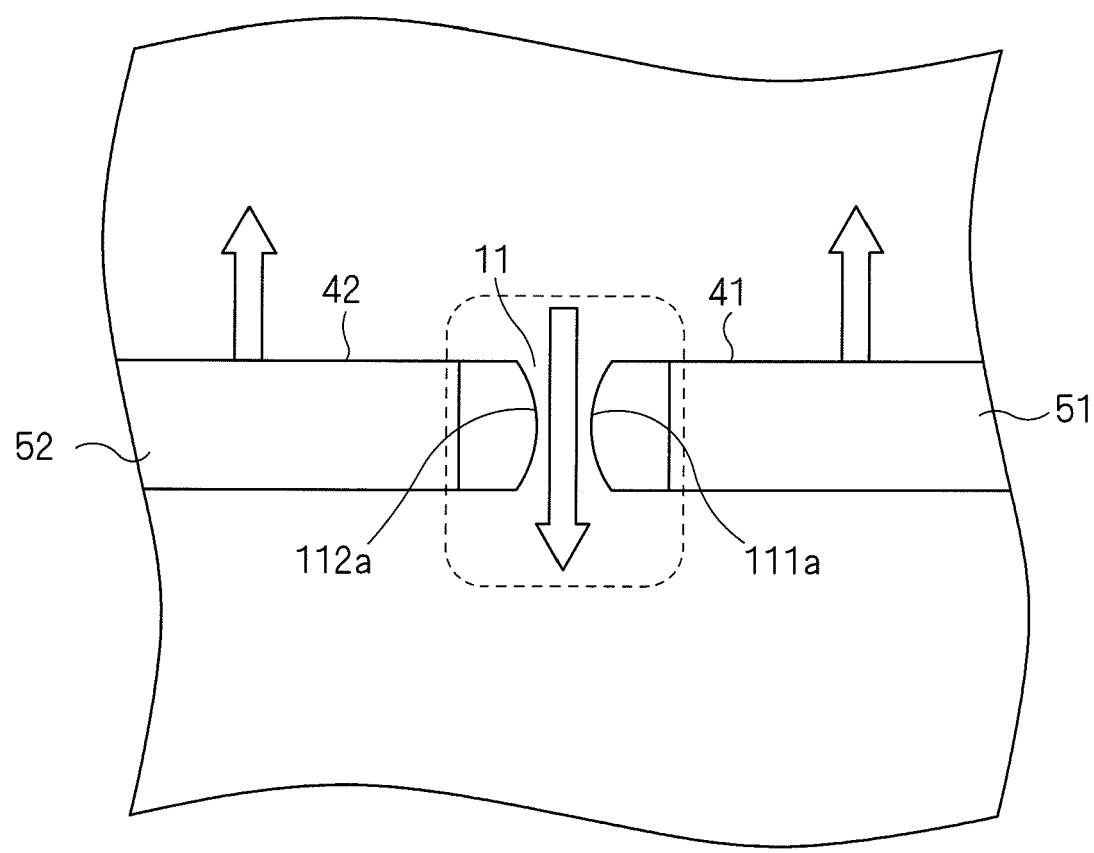
FIG. 15 is a view showing a conceptual structure of a field element corresponding to one coupling part.

Next, magnetic properties of a field element in which field magnets are inserted into field magnet through holes are discussed. Description is given here by taking, as an example, the field element core 1 that includes the field magnet through holes 41 and 42 but does not include the field magnet through hole 44. That is, the field magnet through holes 41 and 42 are opposed to each other in the peripheral direction via one coupling part 11 in FIG. 1. FIG. 15 shows only a portion corresponding to one coupling part of the field element. In FIG. 15, the field magnet 51 and a field magnet 52 are inserted into the field magnet through holes 41 and 42 along the axis direction, respectively. The field magnets 51 and 52 have, for example, a plate-like shape and are disposed with a thickness direction thereof being approximately toward a radial direction.

The field magnets 51 and 52 are apart from each other in the peripheral direction, and thus part of magnetic fluxes generated from the field magnets 51 and 52 is short-circuited to itself via the space between the field magnets 51 and 52. Note that in a case of the field magnets 51 and 52 having a rectangular shape in cross section perpendicular to an axis of rotation, cavities are generated between the curved portions 111a and 112a of the field magnet through holes 41 and 42 and the field magnets 51 and 52, respectively. The part of the magnetic fluxes passes not only through the coupling part 11 arranged between the field magnets 51 and 52 but also through the cavities. Other part of the magnetic fluxes is supplied to an armature (not shown) opposed to the field element in the radial direction.

The part of magnetic fluxes that is short-circuited via the space between the field magnets 51 and 52 (hereinafter, referred to as short circuit flux) does not contribute to an operation of the rotating electric machine that includes a field element and an armature, and thus shot circuit flux as described above is desired to be as little as possible.

The short circuit flux as described above is generated also in a conventional field element including a rectangular field magnet through hole that is not provided with the curved portions 111a and 112a.

Here, it is revealed that compared with a conventional field element that generates the same maximum stress, an effect of reducing a short circuit flux is larger in the field element using the field element core according to the present invention. Note that in a conventional field element, a maximum stress depends on a width of a coupling part in the peripheral direction. Therefore, a width of a coupling part of a conventional field element is set such that the same maximum stress as the maximum stress of the field element according to the present invention is generated.

As an evaluation value for evaluating magnitude of a short circuit flux, there is introduced a ratio of a short circuit flux to magnetic fluxes generated from the field magnets 51 and 52 (sum of short circuit flux and magnetic flux supplied to the armature). Note that in a case of a field element that includes the field element core 1 including the field magnet through holes 41, 42 and 44, and the field magnets individually inserted into the field magnet through holes 41, 42 and 44, an evaluation value is defined as follows. That is, it is for example, a ratio of a total sum of short circuit fluxes generated by three field magnets being short-circuited therebetween to a total sum of magnetic fluxes generated by those three field magnets, the three field magnets being individually inserted into the field magnet through holes 41, 42 and 44. The short circuit flux as described above is desired to be small, and thus the evaluation value is desired to be small.

Evaluations are made on a difference between an evaluation value E1 in the field element according to the present invention and an evaluation value E2 in a conventional field element that generates the same maximum stress as the field element according to the present invention, using an evaluation value E3 expressed by the following expression.

$$E3=(E1-E2)/E2\times100 \qquad (6)$$

Figure 16:
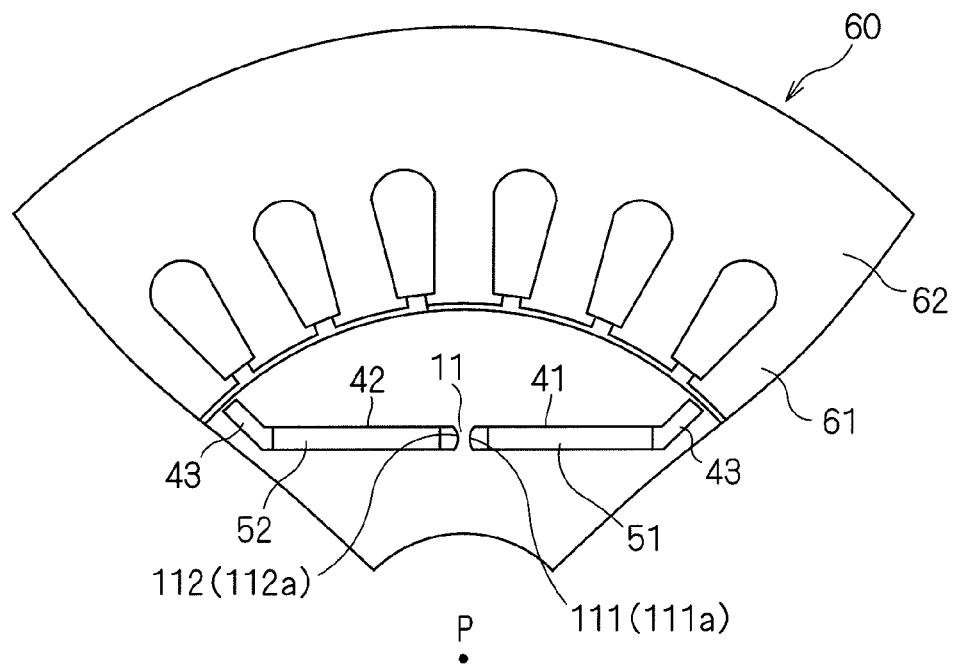
FIG. 16 is a view showing a simulation model of a field element according to the present invention.
Figure 17:
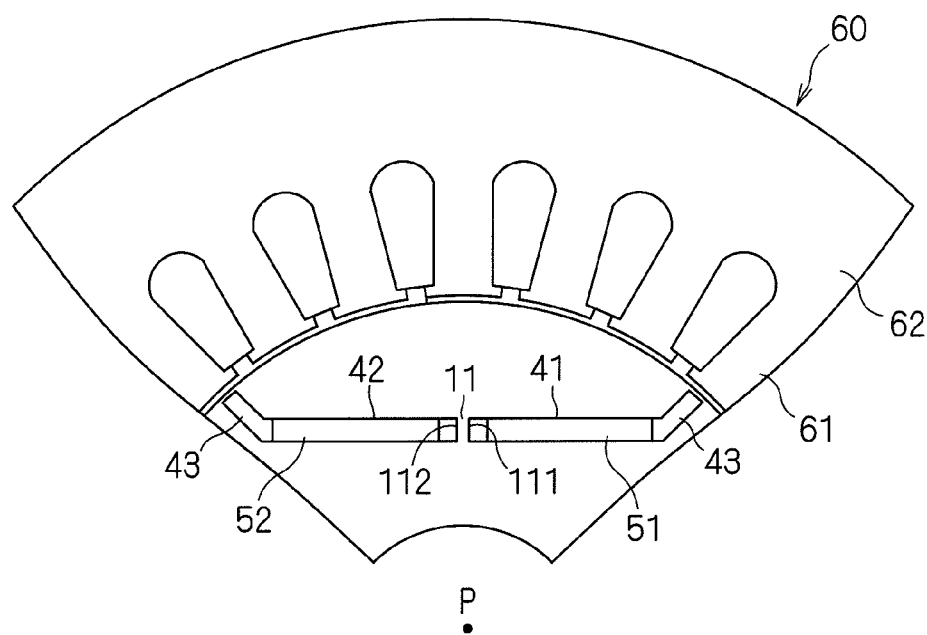
FIG. 17 is a view showing a simulation model of a conventional field element.

FIG. 16 and FIG. 17 show simulation models of a rotating electric machine used in calculating the evaluation value E3. FIG. 16 and FIG. 17 each show only a portion corresponding to a set of field magnet through holes 41 and 42. As shown in FIG. 16, in this field element, the lateral surfaces 111 and 112 of the coupling part 11 include the curved portions 111a and 112a that are entirely curved to form a concave shape along a circle, respectively. As shown in FIG. 17, in a conventional field element, the lateral surfaces 111 and 112 of the coupling part 11 respectively have a flat surface. FIG. 16 shows a rotating electric machine using the field element according to the present invention, whereas FIG. 17 shows a rotating electric machine using a conventional field element. The same armature 60 is used in any of the rotating electric machines. The armature 60 includes, for example, twenty-four teeth 61 and a back yoke 62 that magnetically couples the teeth 61.

Simulation conditions are; an outer diameter of a field element core is 88.6 (mm), an air gap length between an armature and a field element is 0.7 (mm), a coercive force bHc of a field magnet is 963 (kA/m), a thickness of the field magnet in a radial direction is 2.8 (mm), a length of one field magnet in a peripheral direction is 20.9 (mm), a distance between ends of the field magnets adjacent to the coupling part 11 is 6.2 (mm), and a minimum width Lb of the coupling part 11 in the peripheral direction of this field element is 0.6 (mm) Note that a roundness of 0.3 (mm) is provided to corners of the field magnet through holes 41 and 42. The length of the field magnet used in this field element in the peripheral direction, magnetic properties of the field magnet, an air gap length between this field element and the armature and the like affect the short circuit flux, which are calculated using the same values in the field element according to the present invention and a conventional field element. The evaluation value E3 is calculated based on a ratio between a short circuit flux of the field element according to the present invention and a short circuit flux of a conventional field element, and thus even when the above-mentioned conditions are values different from the calculated values, its influence on the evaluation value E3 is small. Accordingly, the description below is applied to a field element even if conditions thereof are different from those described above.

As to the field element according to the present invention, the ratio Rb/Lm and the ratio Lc/Lm were changed to calculate the evaluation value E1 on the above-mentioned conditions. As to a conventional field element, the width of the coupling part 11 was set so as to generate the same maximum stress as the maximum stress generated in the field element according to the present invention, and the evaluation value E2 was calculated on the above-mentioned conditions.

FIG. 18 shows the evaluation value E3 by contour lines, where a horizontal axis and a vertical axis represent the ratio Rb/Lm and the ratio Lc/Lm, respectively. Numbers attached to the contour lines indicate values of the evaluation value E3. In addition, the region shown in FIG. 8 is indicated by a heavy line.

The contour line in which the evaluation value E3 indicates 0 means that there is no difference in an effect of reducing a short circuit flux between the field element according to the present invention and a conventional field element that generates the same maximum stress as the maximum stress generated in this. The regions in which the evaluation value E3 indicates positive values mean that the effect of reducing a short circuit flux of the field element according to the present invention is smaller than the effect of reducing a short circuit flux of a conventional field element that generates the same maximum stress. The regions in which the evaluation value E3 indicates negative values mean that the effect of reducing a short circuit flux of the field element according to the present invention is larger than the effect of reducing a short circuit flux of a conventional field element that generates the same maximum stress.

The simulation results shown in FIG. 18 reveal that the evaluation value E3 indicates negative values in the regions shown in FIG. 8, that is, the regions that satisfy Expressions (2) to (5). Therefore, in the regions that satisfy Expressions (2) to (5), a maximum stress generated in the field element core can be reduced, and further, an effect of reducing a short circuit flux is larger compared with a conventional field element that generates the same maximum stress. Further, the regions that satisfy Expressions (2) to (5) are included in the region in which the evaluation value E3 indicates −10 or smaller, and thus it is revealed that an effect of reducing a short circuit flux of the field element according to the present invention is larger by 10% or more than that of a conventional field element that generates the same maximum stress.

In addition, among the regions that satisfy Expressions (2) to (5), the evaluation value E3 indicates values of −30 or smaller in the regions in the vicinity of the region where the ratio Lc/Lm=0.5 and the ratio Rb/Lm=1.2. It is revealed that in the region surrounded by the contour line in which the evaluation value E3 indicates −30, an effect of reducing a short circuit flux of the field element according to the present invention is larger by 30% or more than that a conventional field element that generates the same maximum stress. The effect of reducing a short circuit flux is particularly large in this region.

Note that evaluations may be made by using values themselves of the short circuit fluxes of respective shapes as the evaluation values E1 and E2 and using the evaluation value E3 from Expression (6). Also when the simulation this time was evaluated using this, the results shown in FIG. 18 were almost the same.

Figure 19:
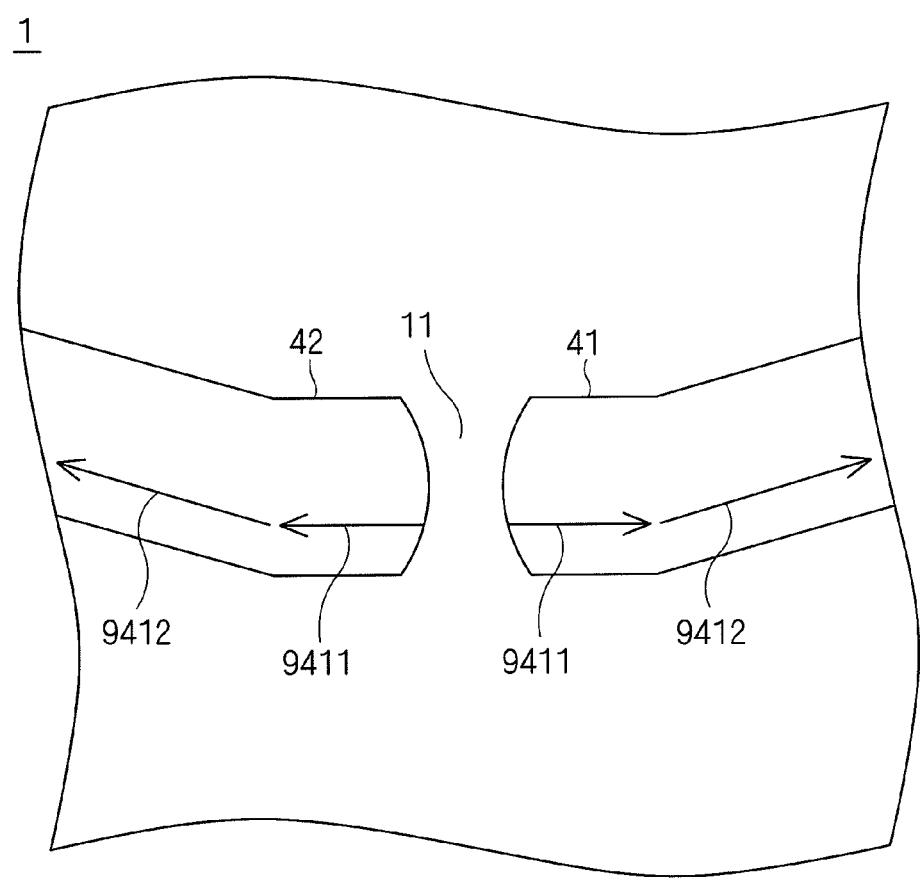
FIG. 19 is a view showing a conceptual structure of a field element core corresponding to one coupling part.

Note that the field magnet through hole 41 may be curved or bent to extend. FIG. 19 shows another conceptual example of a portion corresponding to one coupling part of a field element core in which the field magnet through holes are bent to extend.

The field magnet through hole 41 extends along a predetermined linear direction 9411 from the coupling part 11 and is bent at a predetermined position to extend along another predetermined linear direction 9412 different from the predetermined direction 9411. In other words, it is considered that the directions in which the field magnet through hole 41 extends are two linear directions 9411 and 9412. In the field element core 1 having the above-mentioned structure, as the length Lm, there may be employed a length of the curved portion 111 in a direction perpendicular to a linear extending direction that is the closest to the coupling part 11 among linear extending directions in which the field magnet through hole 41 extends from the coupling part 11. In other words, the length of the curved portion 111 in a direction perpendicular to the direction 9411 starting from the coupling part 11 among the directions 9411 and 9412 in which the field magnet through hole 41 extends is employed.

Note that in a case where the field magnet through hole 41 is curved to extend, tangential directions of the field magnet through hole 41 may be used as an extending direction thereof, and the length of the curved portion 111 in the direction perpendicular to the direction starting from the coupling part 11 among a plurality of tangential directions in which the field magnet through hole 41 extends may be used as the length Lm. This is because the lateral surfaces of the coupling part 11 are formed of the ends of the field magnet through holes 41 and 42, whereby the stress generated in the coupling part 11 depends on the ends of the field magnet through holes 41 and 42.

Second Embodiment

FIGS. 20 to 24 each show cases where the lateral surfaces 111 and 112 of the coupling part 11 shown in FIG. 2 include plane portions (hereinafter, referred to as "plane portions") 121b and 122b, 131b and 132b, 141b and 142b, 151b and 152b, and 161b and 162b, respectively, which extend along the direction 95 perpendicular to the given direction 94. In this case, the lateral surfaces 111 and 112 include curved portions 121a and 122a, 131a and 132a, 141a and 142a, 151a and 152a, and 161a and 162a in addition to the plane portions 121b and 122b, 131b and 132b, 141b and 142b, 151b and 152b, and 161b and 162b. As described in the first embodiment, when the given direction 94 is considered to be the direction in which the field magnet through holes 41 and 42 each extend from the coupling part 11, the plane portions 121b, 131b, 141b, 151b, 161b, 122b, 132b, 142b, 152b and 162b are considered to extend along the direction 95 perpendicular to the direction 94.

In FIG. 20, the plane portions 121b and 122b are provided to ends of the lateral surfaces 111 and 112 on the core part 2 side, respectively. The plane portion 121b projects from the curved portion 121a along the given direction 94. The plane portion 122b projects from the curved portion 122a along the given direction 94.

Note that the plane portions 121b and 122b may be provided to ends of the lateral surfaces 111 and 112 on the core part 3 side, respectively.

Figure 21:
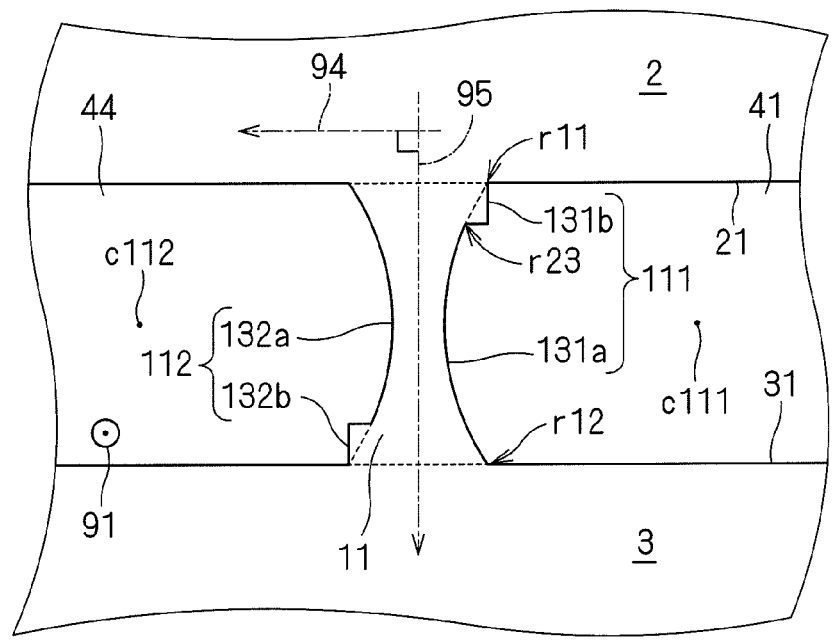

In FIG. 21, the plane portion 131b and the plane portion 132b are provided to the end of the lateral surface 111 on the core part 2 side and the end of the lateral surface 112 on the core part 3 side, respectively. The plane portion 131b projects from the curved portion 131a along the given direction 94. The plane portion 132b projects from the curved portion 132a along the given direction 94.

Figure 22:
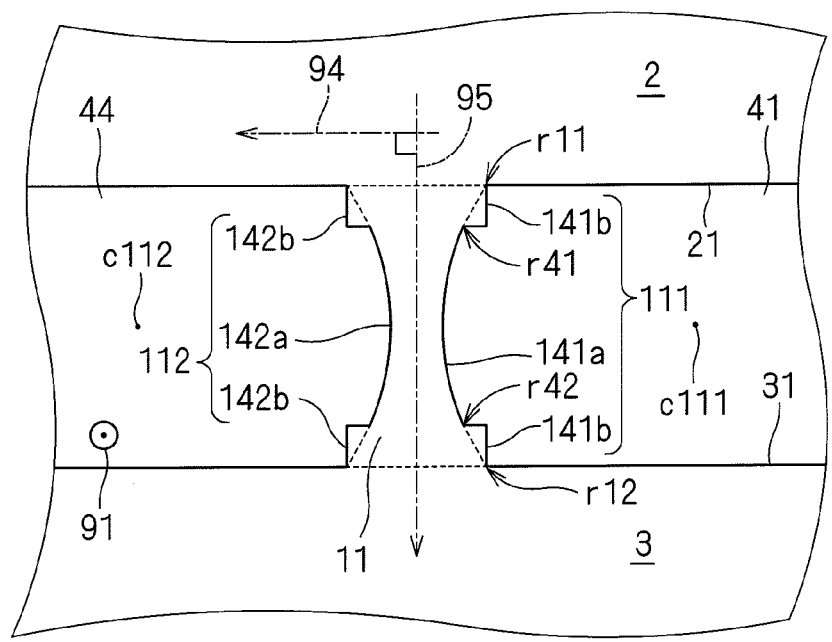

In FIG. 22, the plane portions 141b and the plane portions 142b are provided to both ends of the lateral surface 111 and both ends of the lateral surface 112, respectively. The plane portions 141b project from the curved portion 141a along the given direction 94. The plane portions 142b project from the curved portion 142a along the given direction 94.

Figure 23:
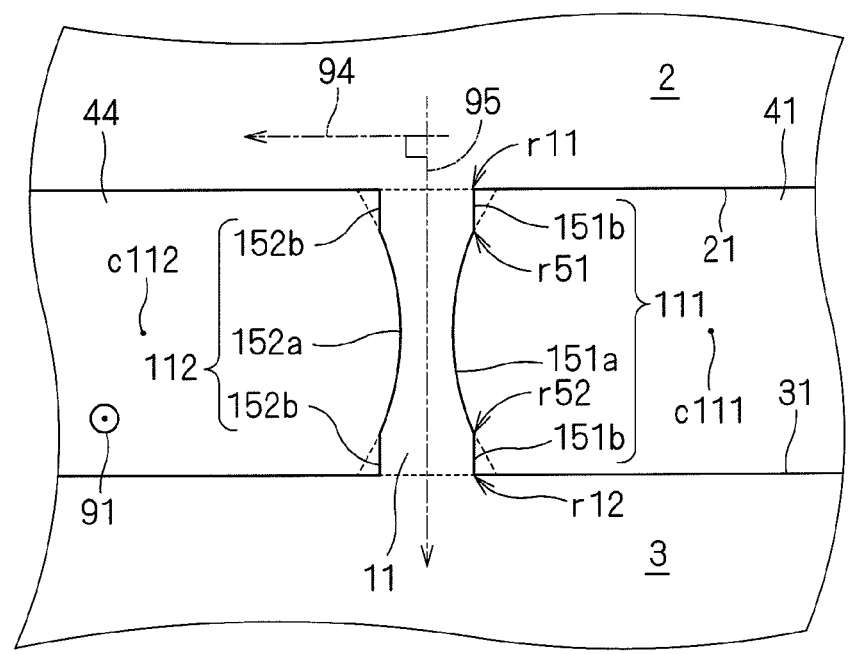

In FIG. 23, the plane portions 151b and the plane portions 152b are provided to both ends of the lateral surface 111 and both ends of the lateral surface 112, respectively. The curved portion 151a is directly connected to the plane portions 151b. The curved portion 152a is directly connected to the plane portions 152b.

Figure 24:
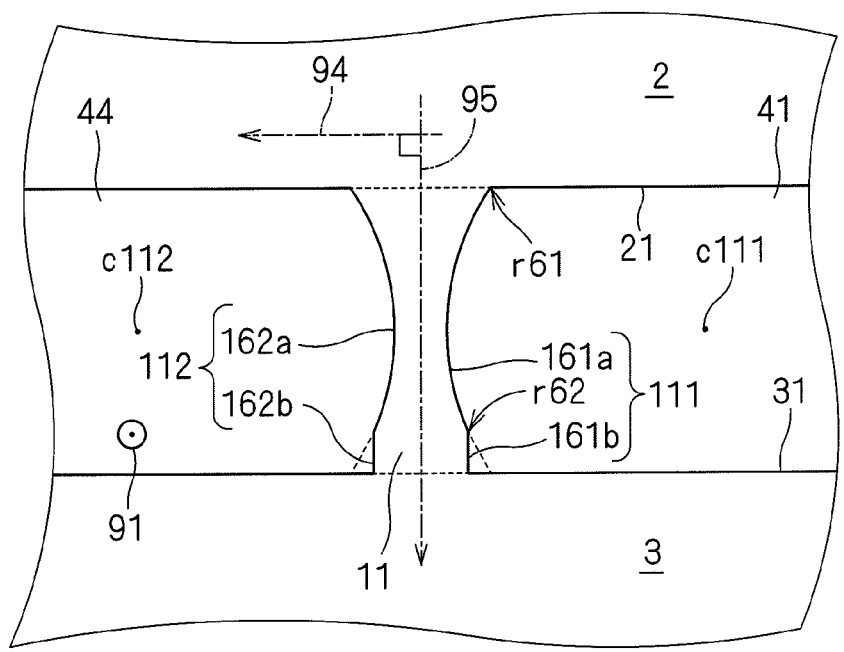

In FIG. 24, the plane portions 161b and 162b are provided at the ends of the lateral surfaces 111 and 112 on the core part 3 side, respectively. The curved portions 161a and 162a are directly connected to the curved portions 161b and 162b, respectively.

Note that the plane portions 161b and 162b may be provided at the ends of the lateral surfaces 111 and 112 on the core part 2 side, respectively.

Shapes of those lateral surfaces 111 are considered as follows. That is, at least ones r21, r23, r41, r42, r51, r52, r61 and r62 of the ends of the curved portions 121a, 131a, 141a, 151a and 161a, when viewed from a predetermined direction 91, are connected to the surfaces 21 and 31 of the field magnet through hole 41 on the same side as those ends with respect to the curved portions 121a, 131a, 141a, 151a and 161a, via the plane portions 121b, 131b, 141b, 151b and 161b. The lateral surface 112 is understood also in a similar manner.

According to the above-mentioned shapes of the lateral surfaces 111 and 112, the stress generated in the coupling part 11 can be dispersed by the curved portions 121a, 131a, 141a, 151a, 161a, 122a, 132a, 142a, 152a and 162a. In addition, by providing the curved portions 121a, 131a, 141a, 151a, 161a, 122a, 132a, 142a, 152a and 162a to the lateral surfaces 111 and 112, it is possible to provide the plane portions 121b, 131b, 141b, 151b, 161b, 122b, 132b, 142b, 152b and 162b without reducing an area of the field magnet through hole that is viewed from the predetermined direction 91. In a case where magnets are inserted into the field magnet through holes 41 and 42, the magnets can be fixed in the plane portions.

In the first embodiment, the result that a maximum value of the stress decreases by setting the ratio Rb/Lm and the ratio Lc/Lm in the region shown in FIG. 8 is obtained by a simulation. Further, the result that the effect of reducing a short circuit flux is larger in this region compared with a conventional field element that generates the same maximum stress is obtained as well. The width Lm can be regarded to be the length Ln of a curved portion of the lateral surface 111 in the perpendicular direction 95. Therefore, it is conceivable that similar results will be obtained even when the lengths Ln of the curved portions 121a, 131a, 141a, 151a, 161a, 122a, 132a, 142a, 152a and 162a in the perpendicular direction are employed as the width Lm.

FIG. 25 shows, by contour lines 701 to 703, the results of the stress generated in the coupling part 11 shown in FIG. 22 that are obtained by a simulation. The contour lines 701 to 703 indicate stresses that become larger in this order.

The conditions of the simulation are; the outer diameter of the field element core 1 is 90 (mm), the number of revolutions is 120 (/sec), the minimum width Lb of the coupling part 11 in the given direction 94 is 0.6 (mm), the width Lm is 2.8 (mm), the length Ln is 1.8 (mm), the radius Rb is 2.3 (mm), and the ratio Rb/Ln is 1.28.

FIG. 25 revels that the stress becomes a maximum at the centers of the curved portions 141a and 142a in the direction 95 perpendicular to the given direction 94. The stresses in those portions were approximately 120 (MPa).

Figure 26:
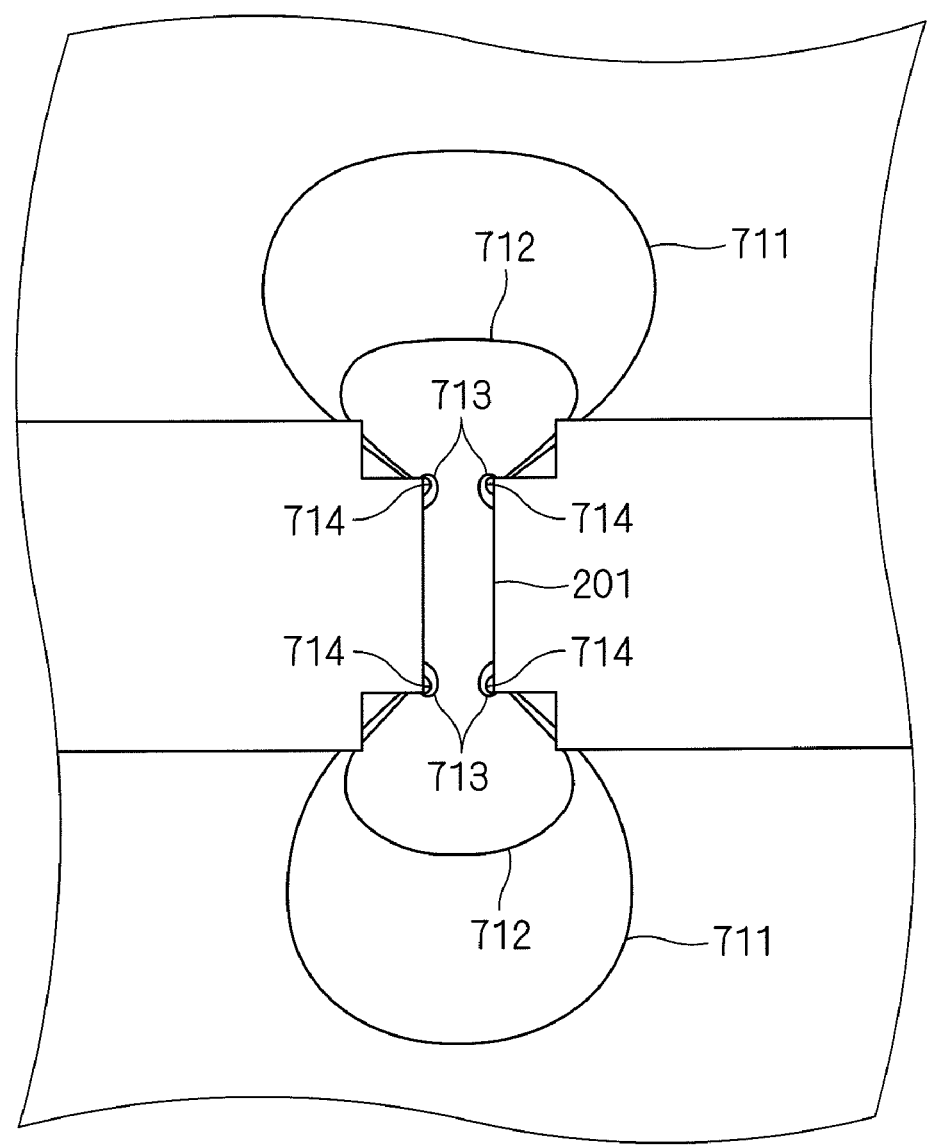
FIGS. 26 and 27 are views showing a stress generated in a coupling part that has a shape different from that of the coupling part 11.
Figure 27:
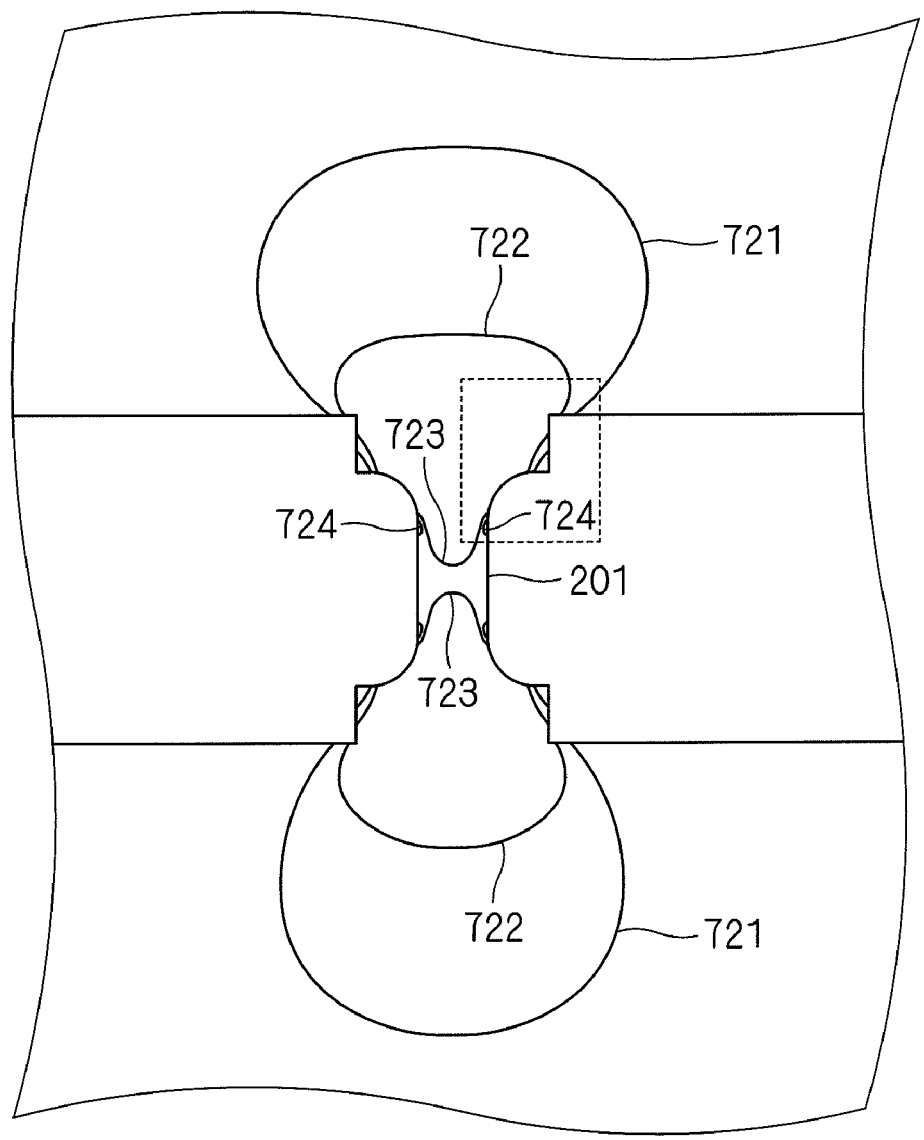

FIG. 26 and FIG. 27 show the results of a coupling part having a shape different from that of FIG. 25 that are obtained by simulations, for comparison with the results shown in FIG. 25. FIG. 26 shows the results of one obtained by making the curved portion of the coupling part 111 flat (those parts are referred to as "flat portions 201" in this case), by contour lines 711 to 714 for the stress. The contour lines 711 to 714 indicate stresses that become larger in this order. Note that a thickness of the coupling part for the flat portion 201 in the given direction 94 is 0.6 (mm), and other conditions are the same as those of FIG. 25. FIG. 27 shows, by contour lines 721 to 724, the results of ones obtained by providing a roundness of a radius of 0.5 (mm) to both ends of the flat portion 201 of the coupling part shown in FIG. 26. The contour lines 721 to 724 indicate stresses that become larger in this order. Other conditions are the same as those of FIG. 25.

FIG. 26 reveals that the stress is concentrated on both ends of the flat portion 201. The stress in those portions was approximately 139 (MPa). FIG. 27 reveals that the stress was concentrated in the vicinity of the portions in which a rounded part and the flat portion 201 are connected to each other. The stress in those portions was approximately 130 (MPa).

The results above reveal that when the curved portion 141a is provided to the lateral surface 111, the stress concentration in the coupling part 111 is mitigated even in a case where the flat portions 141b and 142b are provided to both ends thereof. Moreover, the minimum width Lb of the coupling part 11 becomes smaller, which prevents short-circuit of a magnetic flux.

Figure 28:
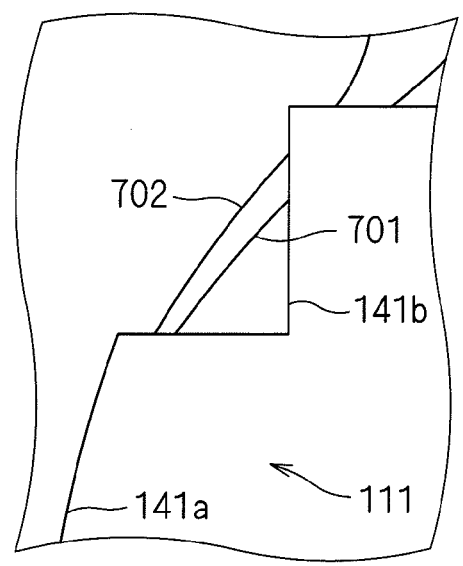
FIG. 28 is a view showing an enlarged region surrounded by a broken line of FIG. 25.
Figure 29:
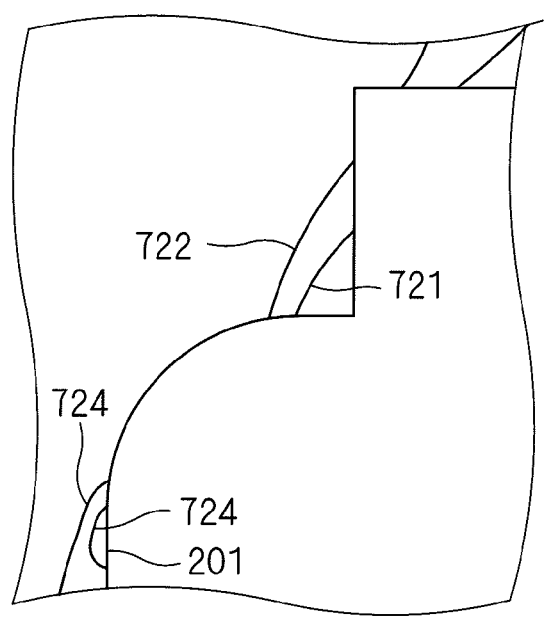
FIG. 29 is a view showing an enlarged region surrounded by a broken line of FIG. 27.

FIG. 28 and FIG. 29 show enlarged regions surrounded by broken lines that are shown in FIG. 25 and FIG. 27, respectively. FIG. 28 reveals that the stress generated at the corner of the flat portion 141b on the curved portion 141a side is small. Moreover, an area of the region (region surrounded by the contour line 701 and the lateral surface 111) in which the stress is small is larger than an area of the region surrounded by the contour line 721 and the lateral surface that is shown in FIG. 29. That is, the stress is difficult to be concentrated on the corner when the flat portion 201 shown in FIG. 27 is curved as the curved portions 141a and 142a (FIG. 25).

Third Embodiment

Figure 30:
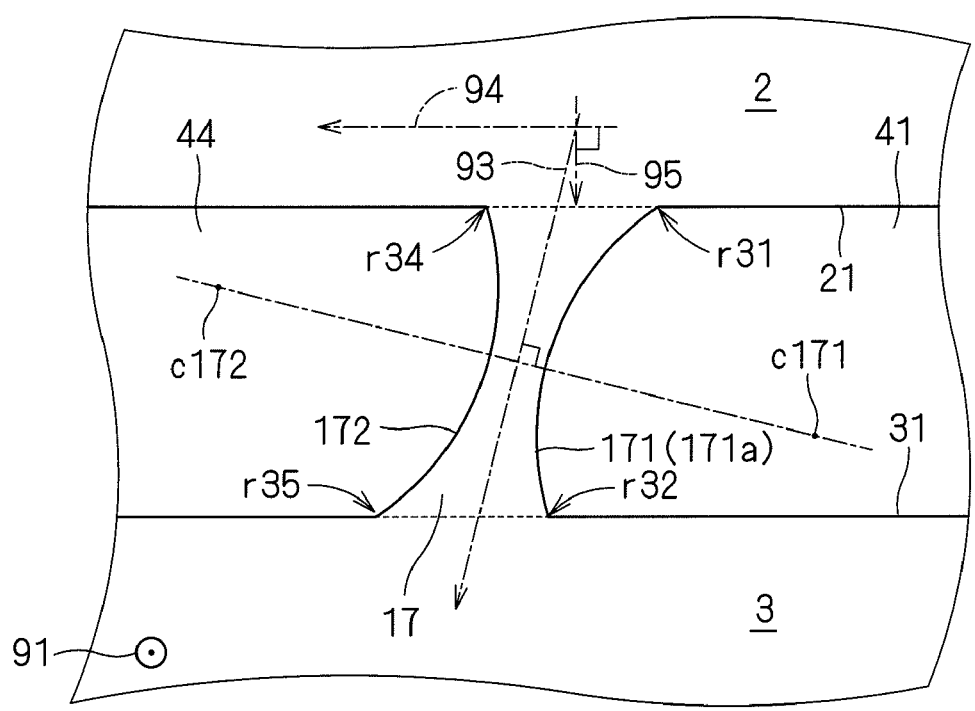
FIG. 30 is a view conceptually showing a coupling part 17 described in a third embodiment.

FIG. 30 shows, as a coupling part 17, the coupling part 11 shown in FIG. 2 in a case where an extending direction 93 thereof is tilted with respect to the direction 95 perpendicular to the given direction 94, when viewed from the predetermined direction 91. Note that reference numerals 171 and 172 are attached to the lateral surfaces of the coupling part 17.

Figure 31:
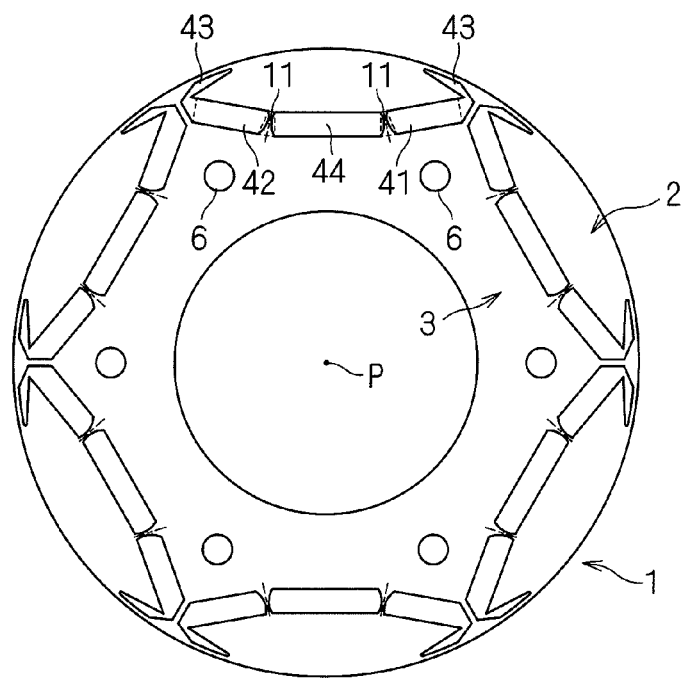
FIG. 31 is a view conceptually showing a field element core 1 described in the third embodiment.
Figure 32:
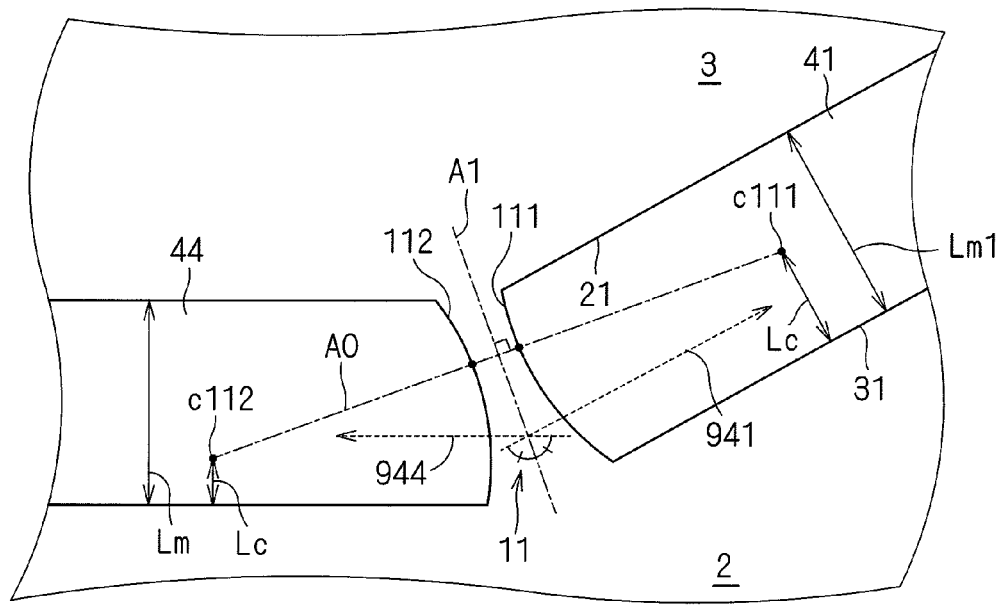
FIG. 32 is a view conceptually showing the coupling part 17 shown in FIG. 31.

FIG. 31 and FIG. 32 show more specific examples. The field element core 1 shown in FIG. 31 is different from the field element core 1 shown in FIG. 1 in that the field magnet through holes 41 and 42 are tilted with respect to the field magnet through hole 44. FIG. 32 shows the enlarged field magnet through holes 41 and 44 of FIG. 31. As shown in FIG. 32, for example, a normal A1 of a straight line A0 that joins the centers c111 and c112 of the curved portions 111 and 112 to each other is parallel to a bisector of an angle formed by directions 941 and 944 on the axis P side. The same holds true for the field magnet through holes 42 and 44.

According to the above-mentioned shape, magnets having lengths longer in directions 941, 942 and 944 can be inserted into the field magnet through holes 41, 42 and 44, respectively.

Alternatively, the normal A1 may extend along a radial direction with the axis P being the center. In this case, deformation of the coupling part 17 can be prevented. This is because though the stress is generated in the field element core in the radial direction with the axis P being the center in a case where the field element core 1 is rotated about the rotation axis along the predetermined direction 91, the width of the coupling part 17 in the direction along the radial direction can be increased, which reduces components of the stress in the direction perpendicular to the radial direction.

Also in the coupling part 17 according to the present embodiment, a plane portion can be provided as in the second embodiment.

Figure 33:
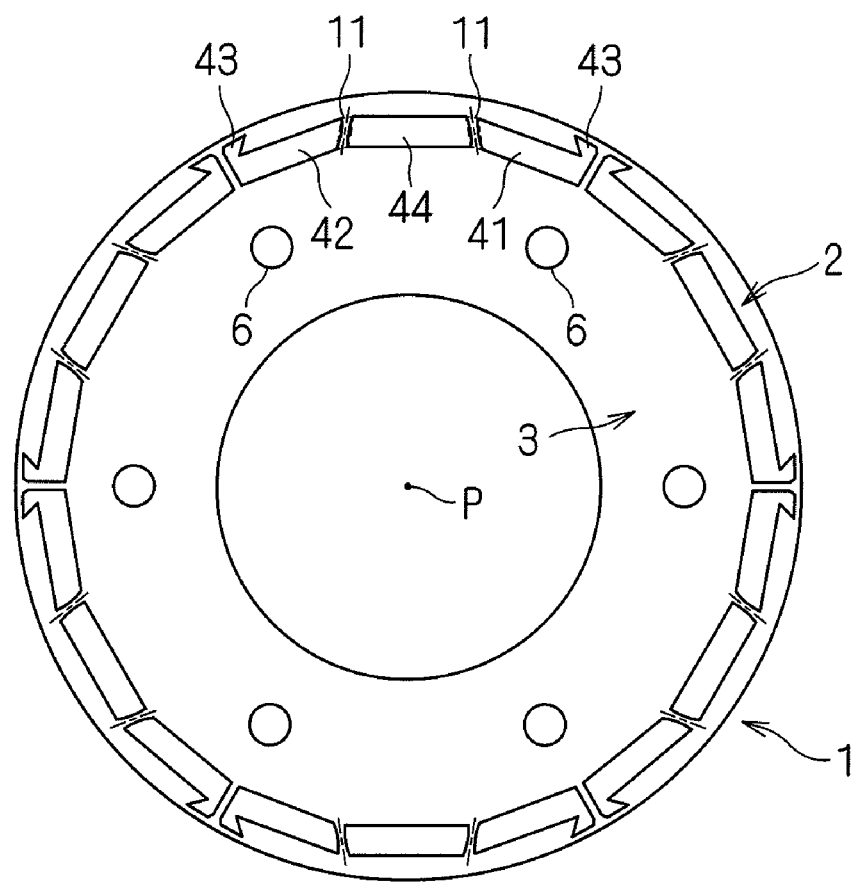
FIG. 33 is another view conceptually showing the field element core 1 described in the third embodiment.

FIG. 33 shows another example of a field element in which the coupling part 11 is tilted. The field magnet through holes 41, 42 and 44 belonging to the same set may be arranged along an outer periphery of the field element core 1. The shape of a curved portion is similar to that of FIG. 32 viewed upside down, and thus detailed description is omitted.

Fourth Embodiment

Figure 34:
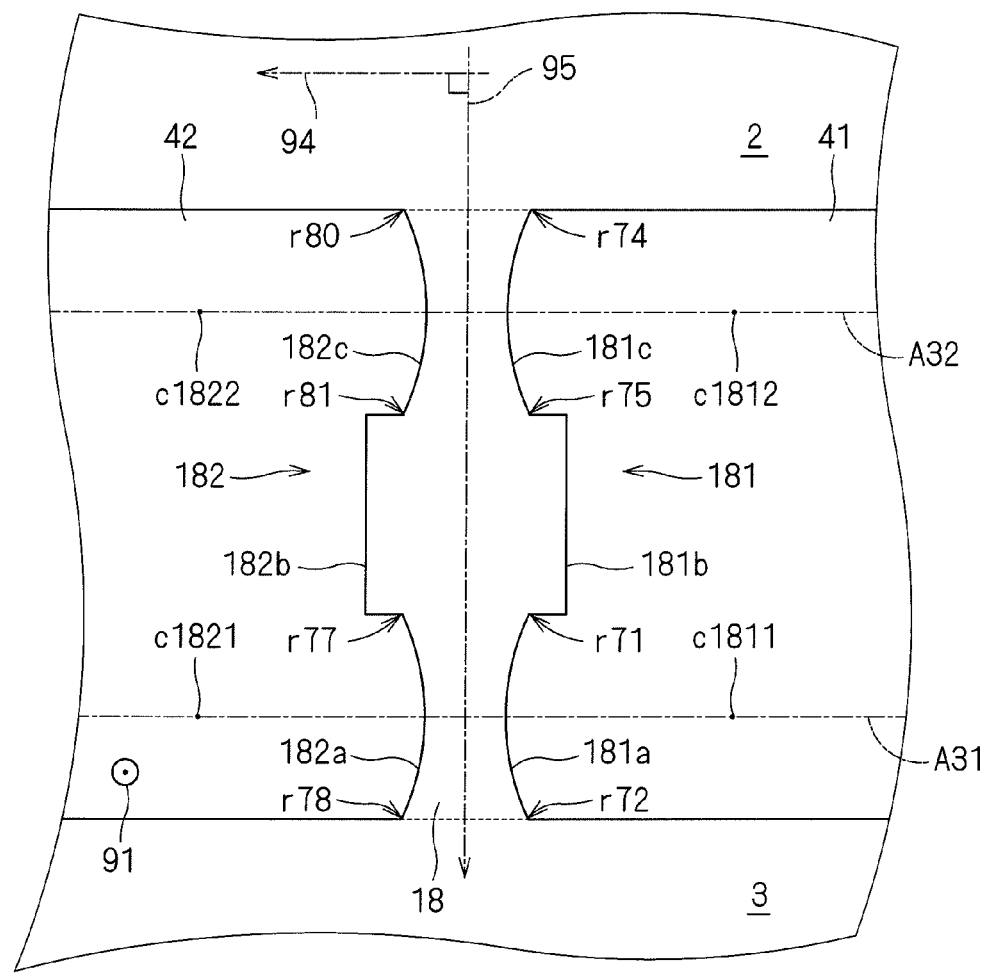
FIG. 34 is a view conceptually showing a coupling part 18 described in a fourth embodiment.

FIG. 34 conceptually shows a coupling part 18 according to the present embodiment. Note that reference numerals 181 and 182 are attached to lateral surfaces of the coupling part 18. In the present embodiment, the field magnet through holes 41, 42 and 44 extend along the given direction 94.

The lateral surface 181 includes curved portions 181a and 181c and a plane portion 181b. The curved portion 181a viewed from the predetermined direction 91 is curved to form a concave shape and extends along a circle having a center c1811.

Similarly to the curved portion 181a, the curved portion 181c is curved to form a concave shape and extends along a circle having a center c1812.

The plane portion 181b is flat along the direction 95 perpendicular to the given direction 94 and is provided between the curved portion 181a and the curved portion 181c.

The plane portion 181b may project beyond the curved portions 181a and 181c along the given direction 94, or ends r71 and r75 of the curved portions 181a and 181c may be directly connected to the plane portion 181b. Note that FIG. 34 shows the shape of the former.

The lateral surface 182 includes curved portions 182a and 182c and a plane portion 182b. The curved portion 182a viewed from the predetermined direction is curved to form a concave shape and extends along a circle having a center c1821.

Similarly, the curved portion 182c is curved to form a concave shape and extends along a circle having a center c1822.

The plane portion 182b is flat along the direction 95 perpendicular to the given direction 94 and is provided between the curved portion 182a and the curved portion 182c. Note that the plane portion 182b is understood in a similar manner as the plane portion 181b as well.

The plane portion 182b may project beyond the curved portions 182a and 182c along the given direction 94, or ends r77 and r81 of the curved portions 182a and 182c may be directly connected to the plane portion 182b. Note that FIG. 34 shows the shape of the former.

According to the above-mentioned shape of the lateral surface 181, the stress generated in the coupling part 18 can be dispersed by the curved portions 181a and 181c. Moreover, in a case where a magnet is inserted into the field magnet through hole 41, the magnet can be fixed in the plane portion 181b. Even in a case where the end surface of the magnet on the coupling part 18 side is curved to form a convex shape, the plane portions 181b and 182b can be provided correspondingly to the end surface. Similarly, the stress can be dispersed in the lateral surface 182, and the magnet inserted into the field magnet through hole 44 can be fixed.

In terms of dispersion of a stress, the lengths that the plane portions 181b and 182b project beyond the curved portions 181a and 182a, respectively, are desirably equal to or smaller than a third of the width Lm.

In a case where radii of the circles with the positions c1811 and c1812 being the center and radii of the circles with the positions c1812 and c1822 being the center are equal to each other, respectively, it can be similarly surmised as in the third embodiment from the simulation results described in the first embodiment. That is, a ratio Rb/Ln1 of a radius Rb to a length Ln1 of the curved portion 181a in the direction 95 perpendicular to the given direction 94 and a ratio of a distance Lc between the center c1812 and the surface 21 to the length Ln1 are set in the region shown in FIG. 8. The same holds true for the curved portions 181a, 181c and 182c. As a result, a maximum value of the stress decreases.

FIG. 35 shows, by contour lines 731 to 735, results of the stress generated in the coupling part 18 shown in FIG. 34 that are obtained by a simulation. The contour lines 731 to 735 indicate stresses that become larger in this order.

The conditions of the simulation are; the outer diameter of the field element core 1 is 88.6 (mm), the number of revolutions is 120 (/sec), the minimum width Lb1 between the curved portions 181a and 182a is 0.6 (mm), the minimum width Lb2 between the curved portions 181c and 182c is 0.6 (mm), the length Lm is 2.8 (mm), the lengths Ln1 and Ln2 are each 1.15 (mm), the radius Rb is 1.4 (mm), and the ratios Rb/Ln1 and Rb/Ln2 are each 1.22. Note that respective ends of the curved portions 181a, 181c, 182a and 182c are provided with a roundness of a radius of 0.2 (mm).

FIG. 35 reveals that the stress becomes a maximum at the centers of the curved portions 181a, 181c, 182a and 182c in the direction 95 perpendicular to the given direction 94. The stress in those portions was approximately 123 (MPa).

Figure 36:
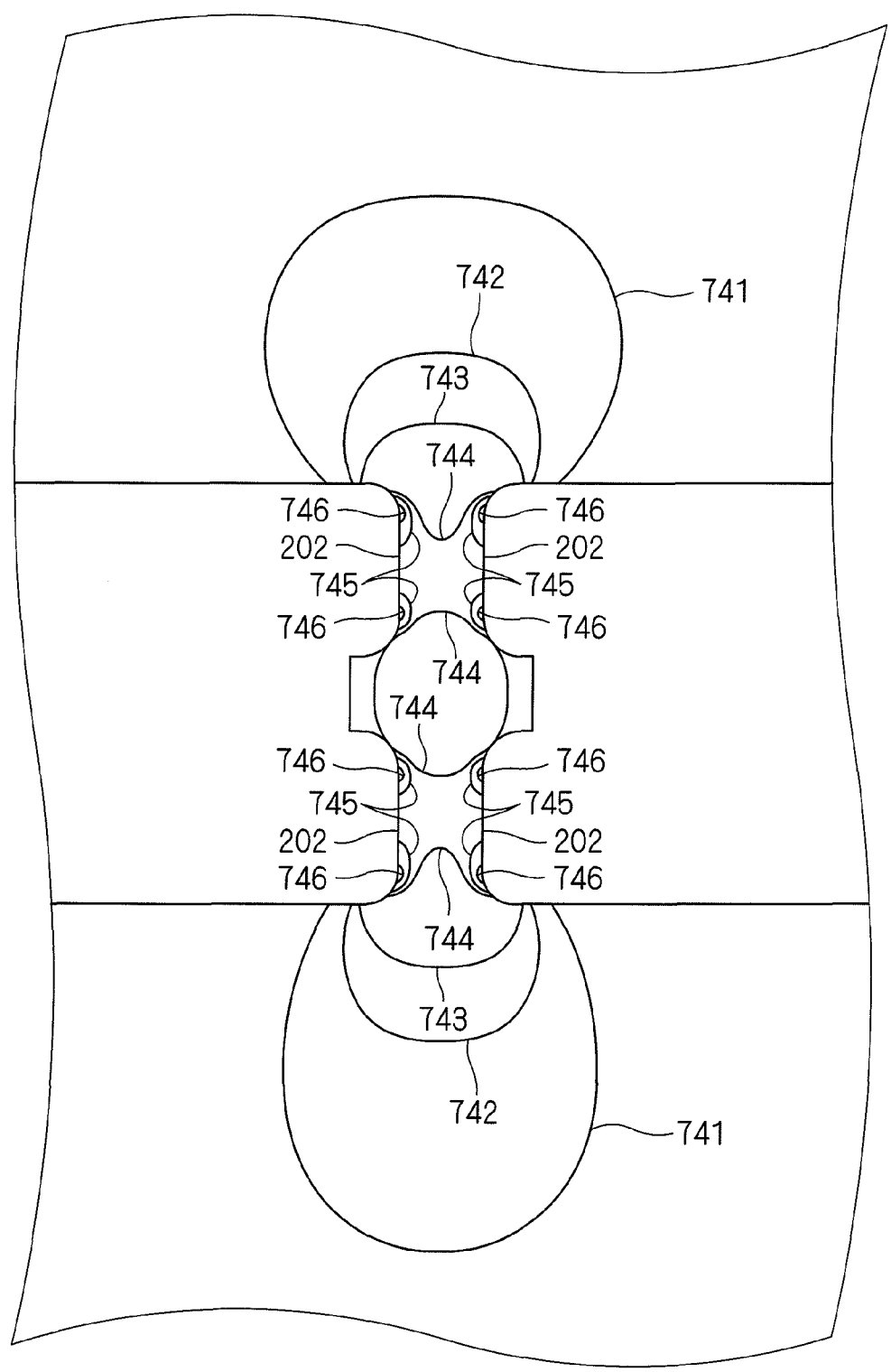
FIG. 36 is a view showing a stress generated in a coupling part that has a shape different from that of the coupling part 18.

FIG. 36 shows, by contour lines 741 to 746, results of a coupling part having a shape different from that of FIG. 34 that are obtained by a simulation, for comparison with the results shown in FIG. 35. The contour lines 741 to 746 become larger in this order. The coupling part has a shape in which the coupling parts 181a, 181c, 182a and 182c are each made to be flat (the above-mentioned portions are referred to as "flat portions 202"), and a roundness of a radius of 0.3 (mm) is provided to both ends of the flat portion 202.

FIG. 36 reveals that the stress is concentrated on both ends of the flat portions 202. The stress in the above-mentioned portions is approximately 140 (MPa).

The results above reveal that when the curved portions 181a, 181c, 182a and 182c are provided to the lateral surface 181 and 182, stress concentration is mitigated compared with a coupling part in which the above-mentioned portions are flat (FIG. 36).

In each of the embodiments described above, in a case where the extending direction 941, 942 and 944 of the field magnet through holes 41, 42 and 44, respectively, intersect each other, "the direction 95 perpendicular to the given direction 94" is replaced with "the direction 951 perpendicular to the extending direction 941 (FIG. 1)" in the description regarding the lateral surfaces 111 and 181 on the field magnet through hole 41 side, whereas "the direction 95 perpendicular to the given direction 94" is replaced with "the direction 954 perpendicular to the extending direction 944 (FIG. 1)" in the description regarding the lateral surfaces 112 and 182 on the field magnet through hold 42 side.

In each of the embodiments described above, application can be made to four or more field magnet through holes that are adjacent to each other in the peripheral direction 92 to form a set. That is, any of the coupling parts 11, 17 and 18 is employed between the field magnet through holes that belong to the same set and are adjacent to each other.

For example, magnetic steel sheets are stacked in the predetermined direction 91, and the respective magnetic steel sheets are caulked together, to thereby obtain the field element core 1.

Figure 37:
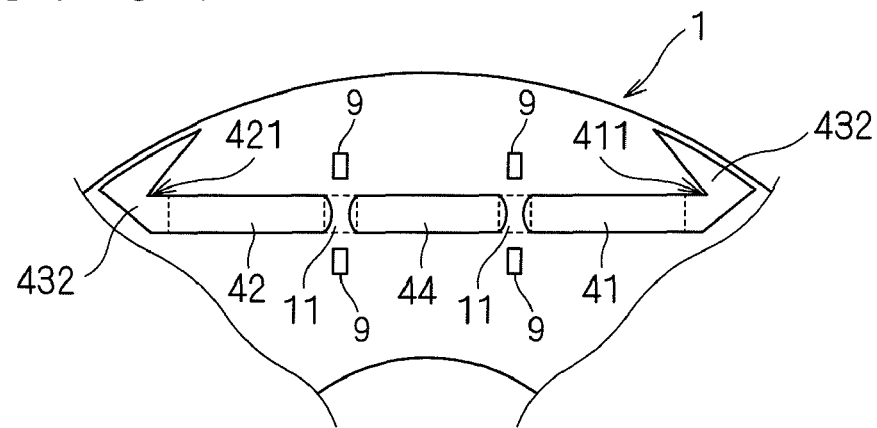
FIGS. 37 and 38 are views conceptually showing positions of caulking 9.
Figure 38:
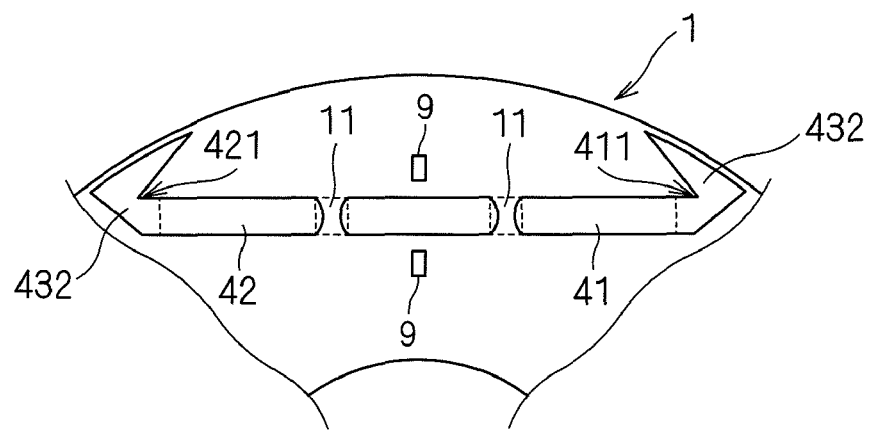

FIG. 37 and FIG. 38 conceptually show positions of caulking 9. In FIG. 37, caulking 9 is provided to each of the core parts 2 and 3 in the vicinity of the centers of the coupling parts 11, 17 and 18 in the peripheral direction with the axis P being the center. The short circuit of magnetic flux is difficult to occur in the coupling parts 11, 17 and 18, and thus the coupling parts 11, 17 and 18 are easy to be magnetically saturated. Therefore, a magnetic flux is difficult to change on both sides of the coupling parts 11, 17 and 18, and hence caulking 9 is desirably provided.

In FIG. 38, caulking 9 is provided to each of the core parts 2 and 3 in the vicinity of the center of the field magnet through holes 41, 42 and 44 in the given direction 94. As a result, a strength is increased in the portions having smaller strength compared with those in the vicinity of the coupling parts 11, 17 and 18, that is, in the portion on the side closer to the cavity 43 with respect to the coupling parts 11, 17 and 18.

Alternatively, magnetic steel sheets stacked in the predetermined direction 91 may be nipped by end plates from both sides in the predetermined direction 91, and the whole thereof is fixed with a pin or bolt, to thereby obtain the field element core 1.

FIG. 1 conceptually shows positions of holes 6 to which a pin or bolt is provided. In FIG. 1, the holes 6 are provided on the side closer to the inner periphery of the field element core 1 with respect to the field magnet through holes 41 and 42 to be adjacent to the field magnet through hole 44 in the radial direction with the axis P being the center. Note that, though not limited thereto, the holes 6 may be provided to be adjacent to the coupling parts 11 in the radial direction. As a result, in a case where a balance weight is attached to a pin or bolt, the field element core 1 is difficult to be deformed even when the centrifugal weight exerted on the balance weight is transmitted to the pin or bolt.

While the invention has been shown and described in detail, the foregoing description is in all aspects illustrative and not restrictive. It is therefore understood that numerous modifications and variations can be devised without departing from the scope of the invention.

The invention claimed is:

1. A field element core, comprising:
field magnet through holes circularly disposed in a peripheral direction around a predetermined axis and being adjacent to each other in said peripheral direction to form sets, each of the field magnet through holes having a pair of ends in said peripheral direction; and
a coupling part provided between two of said field magnet through holes forming one of said sets, said coupling part having lateral surfaces, said ends that belong to said two of said field magnet through holes respectively and are adjacent to each other in said peripheral direction, wherein:
at least one of said lateral surfaces includes at least one of curved portions extending along a circle with a center positioned on a side opposite to said coupling part with respect to said at least one of said lateral surfaces, viewed from a first direction along said axis; and
a first ratio x and a second ratio y satisfy:

$y \leq x - 0.05;$ $y \geq -x + 1.05;$ $y \leq -3/16 \cdot x + 25/32;$ and $y \geq 3/16 \cdot x + 7/32,$ wherein said curved portion, x represents a ratio of a radius of said circle with respect to a length in a third direction perpendicular to a second direction in which one of said field magnet through holes including said at least one of said lateral surfaces extends from said coupling part, and y represents a ratio of a distance between a surface of said one of said field magnet through holes positioned on a side towards said axis in a radial direction and said center with respect to said length of said coupling part in said third direction, a center of said radial direction being said axis.

2. The field element core according to claim 1, wherein said field magnet through holes forming said one of said sets each extend along a given direction determined for each said set, viewed from said first direction, said given direction is parallel to said second direction for each said set.

3. The field element core according to claim 1, wherein said second ratio is 0.5.

4. The field element core according to claim 2, wherein said second ratio is 0.5.

5. The field element core according to claim 1, wherein said second ratio is a value other than 0.5.

6. The field element core according to claim 2, wherein said second ratio is a value other than 0.5.

7. The field element core according to claim 1, wherein:
said lateral surfaces of said coupling part each include said at least one of curved portions; and
a normal of a line joining said center of said at least one of curved portions included in one of said lateral surfaces to said center of at least one of curved portions included in another said surfaces is parallel to a bisector of an angle formed on said axis side by said second directions of said two of said field magnet through holes to which said lateral surfaces respectively belong.

8. The field element core according to claim 1, wherein:
both ends of said at least one of curved portions are connected to surfaces of said one of said field magnet through holes, the surfaces respectively being positioned on an outer peripheral side and an inner peripheral side with respect to said coupling part; and
a boundary between said at least one of curved portions and said coupling part is rounded or forms a corner.

9. The field element core according to claim 1, wherein:
said at least one of said lateral surfaces viewed from said first direction further includes a plane portion which extends along said third direction; and
one end of both ends of said at least one of curved portions is connected to said surface positioned on the same side as said one end with respect to said at least one of curved portions, via said plane portion.

10. The field element core according to claim 9, wherein said one end of said at least one of curved portions is directly connected to said plane portion.

11. The field element core according to claim 9, wherein said plane portion viewed from said first direction projects beyond said at least one of curved portions along said second direction.

12. The field element core according to claim 9, wherein:
said at least one of curved portion is a pair of curved portions;
said at least one of lateral surfaces includes, viewed from said first direction, said pair of said curved portions; and
said plane portion is provided between said pair of curved portions.

13. The field element core according to claim 10, wherein:
said at least one of curved portion is a pair of curved portions;

said at least one of lateral surfaces includes, viewed from said first direction, a pair of said curved portions; and said plane portion is provided between said pair of curved portions.

14. The field element core according to claim 11, wherein:

said at least one of curved portion is a pair of curved portions;

said at least one of lateral surfaces includes, viewed from said first direction, a pair of said curved portions; and said plane portion is provided between said pair of curved portions.

15. The field element core according to claim 1, wherein said field magnet through holes are curved or bent from said coupling part to extend, and said second direction is a linear direction extending with said coupling part being a starting point.

* * * * *